US012755210B2

(12) United States Patent
Galvin

(10) Patent No.: US 12,755,210 B2
(45) Date of Patent: Oct. 6, 2026

(54) SYSTEM AND METHOD FOR EXPERIENTIAL MANIFOLD COGNITION IN PERSISTENT COGNITIVE MACHINES

(71) Applicant: AtomBeam Technologies Inc., Moraga, CA (US)

(72) Inventor: Brian Galvin, Silverdale, WA (US)

(73) Assignee: ATOM BEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/379,249

(22) Filed: Nov. 4, 2025

(65) Prior Publication Data

US 2026/0057309 A1 Feb. 26, 2026

Related U.S. Application Data

(63) Continuation-in-part of application No. 19/203,069, filed on Jun. 3, 2025, now Pat. No. 12,481,688, which (Continued)

(51) Int. Cl.
*G06F 16/901* (2019.01)
*G06F 18/2137* (2023.01)
(Continued)

(52) U.S. Cl.
CPC ......... *G06N 20/00* (2019.01); *G06F 16/9024* (2019.01); *G06F 18/21375* (2023.01); *G06F 18/22* (2023.01)

(58) Field of Classification Search
CPC ............... G06F 16/3329; G06F 16/353; G06F 16/3347; G06F 16/9024; G06F 18/22;
(Continued)

(56) References Cited

U.S. PATENT DOCUMENTS 11,847,536 B2 * 12/2023 Chawla .................. G06F 16/36
12,136,025 B1 * 11/2024 Al-Rfou' ........... G06F 16/9024
(Continued)

OTHER PUBLICATIONS

Masci, J., et al., "Geodesic convolutional neural networks on Riemannian manifolds", arXiv:1501.06297v3 [cs.CV] Jun. 8, 2018 (Year: 2018).*

(Continued)

*Primary Examiner* — Abdelali Serrou
(74) *Attorney, Agent, or Firm* — GALVIN PATENT LAW LLC; Brian R. Galvin

(57) ABSTRACT

A system and method for implementing experiential manifold cognition that extends persistent cognitive machines beyond discrete thought caching to continuous geometric representation of experience. The system maintains an experiential manifold comprising a differentiable manifold with Riemannian metric tensor encoding semantic relationships, compression pressure field governing memory consolidation, and potential field encoding goals and attention. Input data is projected onto the manifold through adaptive geometric diffusion preserving semantic structure. The system executes geometric transformations including metric evolution, geodesic computation, and curvature estimation. During non-interactive periods, autonomous evolution occurs through trajectory recombination and selective pruning. A user interface enables visualization and direct manipulation of manifold geometry, translating navigation into geodesic traversal and edits into metric modifications. The system maintains persistence across sessions and enables controlled federation between multiple manifolds through consent-bounded synchronization. Applications include persistent narrative worlds, collaborative cognitive spaces, and experiential intelligence systems that learn through geometric evolution.

20 Claims, 9 Drawing Sheets

Related U.S. Application Data is a continuation-in-part of application No. 19/205,960, filed on May 12, 2025, which is a continuation-in-part of application No. 19/060,794, filed on Feb. 24, 2025, which is a continuation-in-part of application No. 19/044,546, filed on Feb. 3, 2025, which is a continuation-in-part of application No. 19/026,276, filed on Jan. 16, 2025, which is a continuation-in-part of application No. 18/928,022, filed on Oct. 26, 2024, which is a continuation-in-part of application No. 18/919,417, filed on Oct. 17, 2024, now Pat. No. 12,602,586, which is a continuation-in-part of application No. 18/918,077, filed on Oct. 17, 2024, which is a continuation-in-part of application No. 18/737,906, filed on Jun. 7, 2024, and a continuation-in-part of application No. 18/736,498, filed on Jun. 6, 2024.

(60) Provisional application No. 63/651,359, filed on May 23, 2024.

(51) Int. Cl.

*G06F 18/22* (2023.01)
*G06N 20/00* (2019.01)

(58) Field of Classification Search

CPC ........... G06F 18/21375; G06F 11/1446; G06F 40/30; G06F 40/40; G06F 40/284; G06F 40/166; G06F 40/279; G06F 40/20; G06F 40/35; G06F 40/56; G06F 16/2423; G06F 16/9532; G06F 16/957; G06F 40/197; G06F 40/205; G06F 8/33; G06F 9/547; G06F 16/90332; G06F 16/953; G06F 40/186; G06F 9/542; G06F 16/2237; G06F 16/243; G06F 16/24522; G06F 16/24539; G06F 16/25; G06F 16/252; G06F 16/3322; G06F 16/3344; G06F 16/338; G06F 16/383; G06F 16/432; G06F 16/438; G06F 16/8358; G06F 16/90328; G06F 16/9038; G06F 16/906; G06F 16/9535; G06F 16/9538; G06F 16/955; G06F 18/2413; G06F 21/53; G06F 21/552; G06F 21/554; G06F 21/566; G06F 2221/033; G06F 30/13; G06F 40/103; G06F 40/117; G06F 40/194; G06F 40/237; G06F 40/242; G06F 40/258; G06F 40/268; G06F 40/274; G06F 40/289; G06F 40/295; G06F 40/47; G06F 40/58; G06F 9/453; G06F 9/45504; G06F 9/546; G06F 16/345; G06F 16/367; G06F 16/68; G06F 16/93; G06F 18/00; G06F 21/16; G06F 21/84; G06F 40/211; G06F 40/216; G06F 40/44; G06F 8/34; G06F 9/541; G10L 15/063; G10L 15/22; G10L 15/16; G10L 15/1815; G10L 15/26; G10L 2015/223; G10L 25/30; G10L 15/18; G10L 15/183; G10L 15/30; G10L 2015/0631; G10L 2015/0638; G10L 2015/088; G10L 2015/221; G10L 25/48; G10L 15/02; G10L 25/63

See application file for complete search history.

(56) References Cited

U.S. PATENT DOCUMENTS

| | | | | |
|---|---|---|---|---|
| 2004/0083195 | A1 | 4/2004 | McCord et al. | |
| 2009/0235099 | A1 | 9/2009 | Branover et al. | |
| 2019/0147349 | A1* | 5/2019 | Ng | G06N 5/02 706/12 |
| 2020/0285936 | A1* | 9/2020 | Sen | G06N 3/042 |
| 2024/0126811 | A1* | 4/2024 | Law | G06F 16/9024 |
| 2024/0289395 | A1* | 8/2024 | Zhou | G06F 16/9532 |
| 2025/0077840 | A1* | 3/2025 | Germain | G06F 18/2131 |
| 2025/0085894 | A1 | 3/2025 | Lee et al. | |
| 2025/0278634 | A1 | 9/2025 | Kumar et al. | |

OTHER PUBLICATIONS

Chasal et al. (Persistent-Based Clustering in Riemannian Manifolds), Journal of the ACM (JACM), vol. 60, Issue 6, Nov. 1, 2013 (Year: 2013).*
Sarfati et al. (Lines of Thought in Large Language Models, 2024), arXiv:2410.01545v3, Feb. 13, 2025. (Year: 2025).*
Kuhnel et al. (Latent Space Non-Linear Statistics 2018), arXiv:1805.07632v1, May 19, 2018 (Year: 2018).*
Marin (Optimizing AI Reasoning: A Hamiltonian Dynamics Approach to Multi-Hop Question Answering 2024) (Year: 2024).*
Zhang et al. (Hierarchical simplicial manifold learning, 2024) , https://doi.org/10.1093/pnasnexus/pgae530, Nov. 28, 2024 (Year: 2024).*

* cited by examiner

SYSTEM AND METHOD FOR EXPERIENTIAL MANIFOLD COGNITION IN PERSISTENT COGNITIVE MACHINES

CROSS-REFERENCE TO RELATED APPLICATIONS

Priority is claimed in the application data sheet to the following patents or patent applications, each of which is expressly incorporated herein by reference in its entirety:

Ser. No. 19/203,069
Ser. No. 19/205,960
Ser. No. 19/060,794
Ser. No. 19/044,546
Ser. No. 19/026,276
Ser. No. 18/928,022
Ser. No. 18/919,417
Ser. No. 18/918,077
Ser. No. 18/737,906
Ser. No. 18/736,498
63/651,359

BACKGROUND OF THE INVENTION

Field of the Art

The present invention is in the field of computer-implemented machine cognition, and more particularly to systems and methods for representing and evolving persistent experiential geometries.

Discussion of the State of the Art

Modern AI systems commonly store and process experience using discrete vector memories, token caches, replay buffers, key-value attention memories, or graph/embedding indexes. These approaches excel at short-term retrieval and sequence modeling, but their persistence mechanisms are typically add-prune or snapshot-based, lacking a continuous geometric substrate that evolves experience as a shaped space. Likewise, offline adaptation in current practice often reduces to batch retraining, cache refresh, or heuristic pruning, rather than an algorithmic, system-level evolution of the representational space itself.

Research in manifold learning, representation geometry, and world-modeling has introduced geometric intuitions (e.g., embeddings on curved spaces), yet most deployed systems still treat "memory" as a set of points, layers, or weights, not as an explicitly maintained experiential manifold with a programmable metric and field dynamics. Existing methods rarely formalize machine experience as a differentiable object governed by operators (e.g., curvature flows) that continuously reorganize structure, reconcile trajectories, and regulate complexity. Similarly, multi-agent or multi-model "federation" typically exchanges tokens, gradients, or parameters, not controlled alignments between experiential geometries with explicit consent boundaries and reversible provenance. Timing and load management are also often scheduler- or heuristic-driven rather than expressed as explicit pulse hierarchies tied to cognitive operations.

Multi-model or multi-agent federation in the art typically exchanges tokens, gradients, or parameters without principled geometric or statistical alignment across systems, leading to drift, brittle transfer, and opaque failure modes. Consent boundaries are often handled at a policy layer rather than enforced within the data/parameter exchange itself, and provenance is frequently incomplete or non-reversible, complicating audit and rollback. Timing and load management are usually governed by ad-hoc schedulers instead of formal, measurable control schemes, which can degrade synchrony across fast/slow pathways. As a result, cross-system collaboration tends to be heuristic, difficult to verify, and fragile under distribution shift.

What is needed is a system and method for experiential manifold cognition which models experience as a persistent geometry with explicit metrics and fields, evolves that geometry via principled operators for autonomous reorganization and pruning, treats interaction as intent-guided traversal, enables privacy-constrained federation with verifiable, reversible provenance, and regulates timing through measurable pulse hierarchies.

SUMMARY OF THE INVENTION

Accordingly, the inventor has conceived and reduced to practice, a system and method for implementing experiential manifold cognition that extends persistent cognitive machines beyond discrete thought caching to continuous geometric representation of experience. The system maintains an experiential manifold comprising a differentiable manifold with Riemannian metric tensor encoding semantic relationships, compression pressure field governing memory consolidation, and potential field encoding goals and attention. Input data is projected onto the manifold through adaptive geometric diffusion preserving semantic structure. The system executes geometric transformations including metric evolution, geodesic computation, and curvature estimation. During non-interactive periods, autonomous evolution occurs through trajectory recombination and selective pruning. A user interface enables visualization and direct manipulation of manifold geometry, translating navigation into geodesic traversal and edits into metric modifications. The system maintains persistence across sessions and enables controlled federation between multiple manifolds through consent-bounded synchronization. Applications include persistent narrative worlds, collaborative cognitive spaces, and experiential intelligence systems that learn through geometric evolution.

According to a preferred embodiment, a computer system for implementing experiential manifold cognition is disclosed, comprising: a memory storing processor-executable instructions; one or more processors configured to execute the instructions to: maintain an experiential manifold data structure comprising a differentiable manifold, a Riemannian metric tensor encoding semantic relationships between cognitive elements, a compression pressure field governing memory consolidation and abstraction, and a potential field encoding goals and attentional focus; transform input data into geometric representations on the experiential manifold using adaptive geometric diffusion based on semantic similarity relationships; execute geometric transformations on the experiential manifold including metric evolution based on curvature and field gradients, geodesic computation for determining optimal paths through the manifold, and curvature estimation for guiding manifold evolution; perform autonomous manifold evolution during non-interactive periods through trajectory recombination and selective pruning based on cognitive energy density; provide a user interface enabling visualization of manifold structure, interactive navigation through the cognitive space, and direct manipulation of geometric properties; translate user actions into geometric operations wherein user navigation corresponds to geodesic traversal and user edits correspond to metric modifications; maintain continuity of the experiential manifold across system sessions by preserving geometric field data including the metric tensor, curvature values, compression pressure, and potential fields; and enable controlled synchronization between multiple experiential manifolds through shared submanifolds at the intersection of user-defined consent boundaries and weighted integration of geometric updates; wherein the system maintains persistent cognitive capabilities through continuous geometric evolution of the experiential manifold both during user interaction and autonomous operation.

According to another preferred embodiment, a computer-implemented method for experiential manifold cognition is disclosed, comprising the steps of: maintaining, by one or more processors, an experiential manifold data structure comprising a differentiable manifold, a Riemannian metric tensor encoding semantic relationships between cognitive elements, a compression pressure field governing memory consolidation and abstraction, and a potential field encoding goals and attentional focus; transforming input data into geometric representations on the experiential manifold using adaptive geometric diffusion based on semantic similarity relationships; executing geometric transformations on the experiential manifold including metric evolution based on curvature and field gradients, geodesic computation for determining optimal paths through the manifold, and curvature estimation for guiding manifold evolution; performing autonomous manifold evolution during non-interactive periods through trajectory recombination and selective pruning based on cognitive energy density; providing a user interface enabling visualization of manifold structure, interactive navigation through the cognitive space, and direct manipulation of geometric properties; translating user actions into geometric operations wherein user navigation corresponds to geodesic traversal and user edits correspond to metric modifications; maintaining continuity of the experiential manifold across system sessions by preserving geometric field data including the metric tensor, curvature values, compression pressure, and potential fields; and enabling controlled synchronization between multiple experiential manifolds through shared submanifolds at the intersection of user-defined consent boundaries and weighted integration of geometric updates; wherein persistent cognitive capabilities are maintained through continuous geometric evolution of the experiential manifold both during user interaction and autonomous operation.

According to a further aspect, the method includes constructing a landmark graph from representative semantic elements and computing diffusion maps to establish manifold topology that preserves semantic relationships from input content.

According to a further aspect, the method includes implementing a dream operator that applies metric flow equations to smooth redundant structure while reinforcing meaningful patterns through curvature concentration.

According to a further aspect, the method includes maintaining a hierarchical manifold structure comprising a fast manifold for immediate perceptual events, a mesoscale manifold for thematic structures, and a foundational manifold for persistent identity and style.

According to a further aspect, the method includes maintaining the hierarchical manifold structure by implementing cross-scale integration through upward abstraction from fast to slow manifolds and downward constraint injection from slow to fast manifolds.

According to a further aspect, the method includes providing the user interface by generating three-dimensional renderings of manifold neighborhoods with curvature-based visualization and providing real-time navigation feedback as users traverse geodesic paths.

According to a further aspect, the method includes enabling synchronization between multiple experiential manifolds by maintaining privacy through consent boundaries that restrict which manifold regions participate in geometric update exchanges.

According to a further aspect, the method includes implementing temporal pulse regulation that dynamically adjusts processing frequencies based on cognitive load and manifold complexity.

According to a further aspect, the method includes the compression pressure field implementing selective memory consolidation by identifying regions of high semantic density for preservation while allowing low-importance regions to fade through geometric diffusion.

According to a further aspect, the method includes maintaining an immutable provenance log recording all geometric transformations applied to the manifold, supporting transparency and reversibility of operations.

BRIEF DESCRIPTION OF THE DRAWING FIGURES

DETAILED DESCRIPTION OF THE INVENTION

Figure 1:
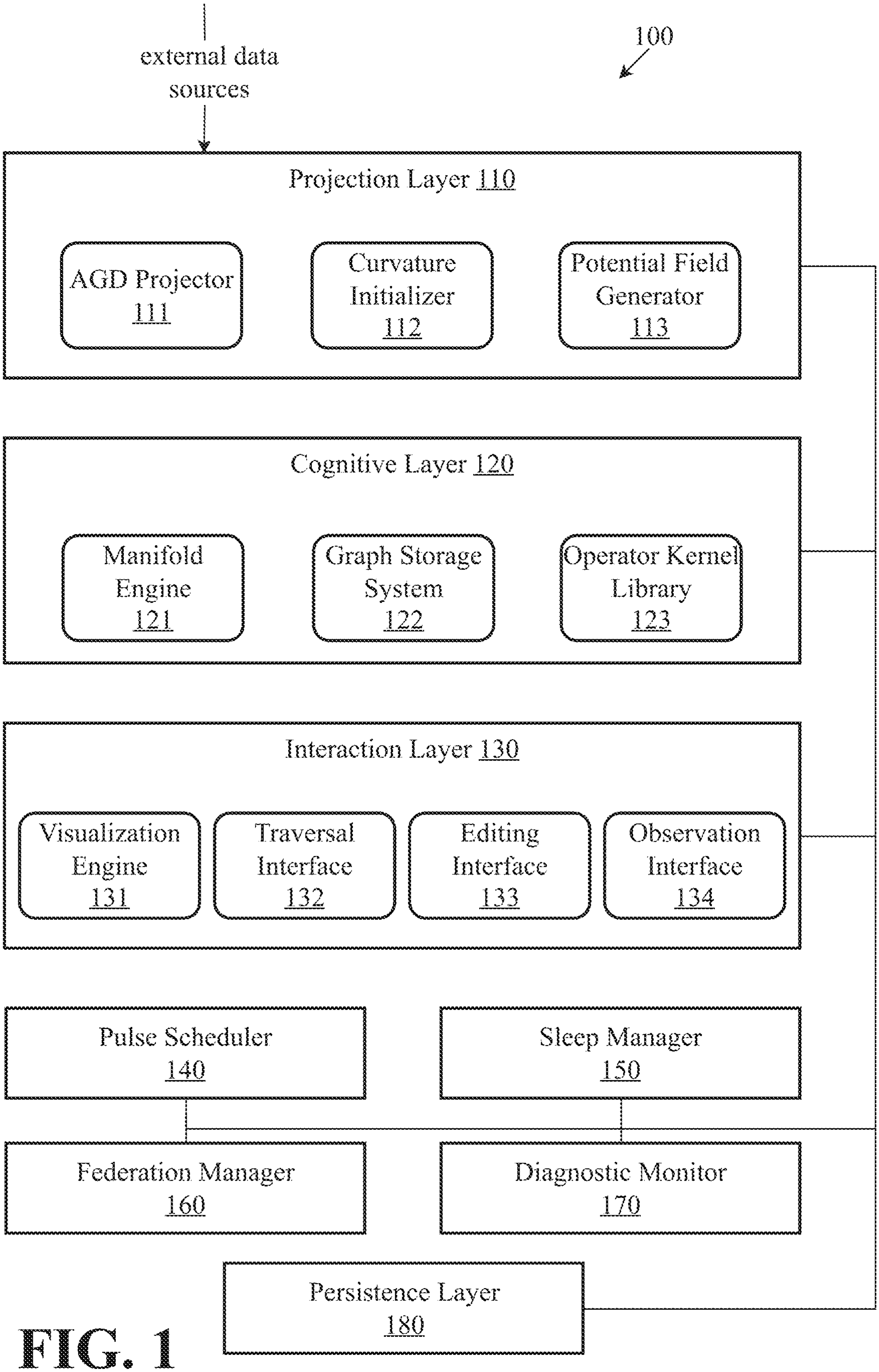
FIG. 1 is a block diagram illustrating an exemplary system architecture of an experiential manifold cognition system, according to an embodiment.

The inventor has conceived, and reduced to practice, a system and method for implementing experiential manifold cognition that extends persistent cognitive machines beyond discrete thought caching to continuous geometric representation of experience. The system maintains an experiential manifold comprising a differentiable manifold with Riemannian metric tensor encoding semantic relationships, compression pressure field governing memory consolidation, and potential field encoding goals and attention. Input data is projected onto the manifold through adaptive geometric diffusion preserving semantic structure. The system executes geometric transformations including metric evolution, geodesic computation, and curvature estimation. During non-interactive periods, autonomous evolution occurs through trajectory recombination and selective pruning. A user interface enables visualization and direct manipulation of manifold geometry, translating navigation into geodesic traversal and edits into metric modifications. The system maintains persistence across sessions and enables controlled federation between multiple manifolds through consent-bounded synchronization. Applications include persistent narrative worlds, collaborative cognitive spaces, and experiential intelligence systems that learn through geometric evolution.

The experiential cognitive system provides a framework which enables experiential intelligence. Experiential intelligence reimagines artificial intelligence (AI) as a "world processor": instead of transient chats, each user launches a living world that keeps evolving on its own timeline. A user can enter, explore, and shape this world; when they step away, it continues to reorganize itself so that ideas become more coherent and clutter fades. Returning feels less like resuming a thread and more like revisiting a place that has matured in their absence.

Day to day, interaction is experiential rather than purely textual. The user can navigate a narrative landscape, watch concepts move and connect, and directly edit or observe its structure, akin to sculpting or touring a map of their own evolving ideas. These "worlds" remember and transform between visits, emphasizing continuity and growth over one-off replies.

A signature behavior is "dreaming," which happens when the user is not there: past threads are consolidated, redundant branches are pruned, and new combinations are explored so the world becomes clearer and more compact over time. This background curation aims to return a space that's trimmer, more connected, and ready for the next round of exploration.

Worlds can also be selectively shared. People may open bounded regions for collaboration, align overlapping areas to reduce misunderstandings, and still preserve autonomy and privacy. If desired, a world can be archived or "flattened" into a stable record—paused and later revived as a template for new journeys.

At a higher level, experiential intelligence frames AI as a continuous, lived medium—less about producing isolated answers and more about cultivating a persistent, comprehensible space of experience for individuals and groups. The result is a platform where intelligence is expressed as sustained continuity, collaborative growth, and ethical sharing of evolving worlds.

According to an embodiment, the persistent cognitive machine implements an experiential manifold architecture that generalizes the thought cache of the PCM architecture into a continuous geometric representation of cognition. The experiential manifold is defined as a four-tuple ME=(M, g, P, Φ), where M represents a differentiable manifold encoding the topology of experience, g represents a Riemannian metric tensor encoding semantic relationships and analogical distances between cognitive elements, P(x,t) represents a compression pressure field that governs abstraction and memory pruning processes, and Φ(x,t) represents a potential field encoding goals, attention, and emotional vectors within the cognitive space.

The experiential manifold evolves according to a geometric flow equation that governs the temporal evolution of the metric tensor:

$$\partial g_{ij}/\partial t = -2R_i c_{ij} + \nabla_i \nabla_j \Phi - \nabla_i \nabla_j P$$

where Ricij represents the Ricci curvature tensor, $\nabla_i \nabla_j$ represents covariant derivatives, and the equation describes how semantic relationships evolve through the balance of curvature diffusion, goal-directed deformation, and compression-driven simplification. This continuous evolution generalizes the discrete sleep and curation mechanisms of the PCM platform into a unified geometric process that operates autonomously during both active and inactive system states.

Memory formation within the experiential manifold corresponds to the emergence of closed or recurrent geodesic trajectories γ(t) that satisfy the equation of motion $$\frac{D}{dt}\dot{\gamma}_i = -\frac{1}{2} g_{ij}(\partial_j P - \partial_j \phi)$$

where D/dt represents the covariant derivative along the trajectory, and the equation describes how cognitive trajectories follow paths of least resistance modified by compression and goal potentials. These geodesic structures provide a mathematical formalization of how repeated experiences create stable memory patterns within the geometric substrate.

The system further implements identity drift mechanisms over extended timescales through gradient descent on a cognitive tension functional C(r), expressed as $$dr/dt = -\nabla_{M3} C(r)$$

where r represents a point on the foundational manifold M3, and the gradient descent ensures that long-term identity evolution maintains coherence with accumulated experiences while allowing for adaptive change. This mechanism enables the persistent cognitive machine to evolve its fundamental characteristics while preserving continuity of identity across extended operational periods.

According to another aspect of an embodiment, user interactions with the persistent cognitive machine are implemented as geometric operations on the experiential manifold, transforming discrete actions into continuous mathematical transformations. Each category of user interaction corresponds to a specific geometric operator that modifies the manifold structure in mathematically well-defined ways, enabling precise control over the evolution of the cognitive space while maintaining geometric coherence.

The system implements a launch operation through a projection operator P: S→M that maps input data from a source space S onto the experiential manifold M using adaptive geometric diffusion (AGD). This projection establishes initial manifold structure by converting raw narrative seeds, textual content, or other input modalities into geometric representations with appropriate curvature, compression pressure, and potential field distributions that encode the semantic content and relationships inherent in the source material.

User inhabitation of the experiential manifold is realized through geodesic traversal, where the user's path $\gamma(t)$ through the cognitive space minimizes an action functional $$S[\gamma] = \int_0^T \left(\|\dot{\gamma}(t)\|_g^2 + P - \phi\right) dt$$

where $$\|\dot{\gamma}(t)\|_g^2$$

represents the kinetic energy of motion with respect to the manifold metric, P represents compression pressure, and $\Phi$ represents the goal potential. This formulation ensures that user navigation follows paths of least cognitive resistance while being attracted toward regions of high relevance or interest as encoded in the potential field.

The system provides editing capabilities through localized metric modifications $\delta g_{ij}$ that allow users to directly reshape the semantic geometry of their experiential space. Observation functionality can be implemented through spectral sampling of the Laplace-Beltrami operator $\Delta_M$, enabling users to perceive the global structure, coherence patterns, and thematic clusters within their manifold through eigenvalue decomposition and spectral analysis.

User intent can be continuously encoded as an active vector field $I(x,t)=\nabla U(x,t)$, where $U(x,t)$ represents a scalar intent function capturing the user's goals, curiosity, and attentional focus. This intent field dynamically deforms the manifold geometry, creating gradients that guide subsequent interactions and autonomous evolution toward user-defined objectives. When users exit the system, autonomous dream cycles are initiated, allowing the manifold to continue evolving according to its internal dynamics while preserving the imprint of user interactions in the geometric structure.

According to another aspect of an embodiment, the persistent cognitive machine implements autonomous geometric evolution through dreaming, curation, and offline adaptation processes that operate during non-interactive states. These processes enable the experiential manifold to self-organize, consolidate experiences, and generate novel insights without external input, extending the sleep state functionality of the PCM architecture into continuous geometric transformations.

The system implements a dream operator that acts on the experiential manifold ME according to the evolution equation $$\partial g_{ij} / \partial t = -2Ric_{ij} + \Phi i_j + \sigma C_{ij}$$

where $Ric_{ij}$ represents the Ricci curvature tensor governing geometric flow, $\Phi_{ij}$ represents the Hessian of the potential field encoding latent goals, $C_{ij}$ represents correlation tensors derived from previously traversed cognitive trajectories, and $\sigma$ controls the amplitude of dream-induced perturbations. This operator enables autonomous exploration of the manifold space through controlled geometric deformation that balances structural stability with creative reconfiguration.

During dreaming cycles, the system performs trajectory recombination through an operator $$R(\gamma_a, \gamma_b) = \exp_{\gamma_a(0)}\left[\alpha \log_{\gamma_a(0)} \gamma_b(0)\right] + \varepsilon$$

where exp and log represent Riemannian exponential and logarithmic maps, $\alpha \in [0,1]$ controls interpolation between trajectories, and $\varepsilon$ represents a stochastic tangent perturbation drawn from a bounded distribution. This recombination mechanism enables the synthesis of novel experiential pathways by blending previously independent cognitive trajectories, subject to coherence constraints that ensure semantic validity.

The curation process implements selective retention and pruning based on cognitive energy density $$E_p = \|A(p)\|^2 + P(p) - \Phi(p)$$

where $A(p)$ represents the local attention velocity field, $P(p)$ represents compression pressure, and $\Phi(p)$ represents goal potential at point p. Regions with persistently low energy density are pruned according to the dynamics $$\partial \rho(p) / \partial t = -\lambda(1 - H(E_p - \theta_c))\rho(p)$$

where $\rho(p)$ represents local manifold density, H represents the Heaviside function, $\theta_c$ represents the curation threshold, and $\lambda$ controls the pruning rate. This mechanism ensures that the experiential manifold maintains computational efficiency by retaining only semantically significant structures while allowing less relevant experiences to fade.

The system demonstrates measurable energy minimization during autonomous operation, with total cognitive energy $$E_{tot}(t) = \int_M \left(\|A(x, t)\|^2 + P(x, t) - \Phi(x, t)\right) d\mu(x)$$

decreasing monotonically according to $$\frac{dE_{tot}}{dt} = -\int_M \|\nabla(P - \Phi)\|^2 d\mu(x) \leq 0$$

This energy descent ensures that each dream cycle produces a more coherent and efficiently organized cognitive structure, analogous to gradient descent optimization but operating on the geometric substrate of experience rather than parametric weights.

According to another aspect of an embodiment, the persistent cognitive machine implements federation capabilities that enable controlled coupling between multiple experiential manifolds while preserving individual autonomy and privacy. This federation mechanism allows users to share cognitive regions, synchronize understanding, and collaboratively evolve their experiential spaces through mathematically constrained geometric alignment rather than raw data exchange.

The system maintains a federated ensemble of N experiential manifolds $$\{M_E^{(i)}\}.$$

where each manifold $$M_E^{(i)} = (M_i, g_i, P_i, \Phi_i)$$

represents an independent cognitive space. Federation is achieved through mapping functions $F_{ij}$: $M_i \rightarrow M_j$ between manifolds, subject to geometric consistency constraints that preserve local structure while enabling global coordination. The system enforces metric alignment through the constraints $$D_{metric}(M_i, M_j) = \int_{M_i} \|g_i - F_{ij}^* g_j\|^2 d\mu$$

where $F_{ij}$ represents the pullback of the mapping function and $\varepsilon^2$ defines the autonomy envelope within which individual variation is preserved.

Federated stability is governed by minimization of a residual functional $$C_{fed} = \sum_i \int_{M_i} C_i(p) d\mu(p) + \sum_{i<j} (D_{metric}(M_i, M_j) + D_{spectral}(M_i, M_j))$$

where $C_i(p)$ represents internal cognitive tension within each manifold and $$D_{spectral}(M_i, M_j) = \sum_k \alpha_k |\lambda_k^{(i)} - \lambda_k^{(j)}|$$

measures spectral divergence between Laplace-Beltrami eigenvalues. The system enables federated equilibrium through gradient flow $$\frac{dM_E^{(i)}}{dt} = -\nabla_{M_E^{(i)}} C_{fed}$$

enabling each manifold to adapt its geometry (e.g., curvature, compression pressure, potential, etc.) for collective coherence while maintaining individual characteristics.

Privacy and consent can be enforced through user-defined boundary conditions $$B_u = \{x \in M_u : \Phi_u(x) < \Phi_{share}\}$$

where $\Phi_{share}$ represents a threshold potential below which regions are eligible for federation. Only manifold regions within these consent boundaries participate in synchronization, ensuring that users maintain explicit control over which aspects of their experiential geometry are shared. The system propagates dream-induced updates between federated manifolds according to $\delta g_j = \eta_{ij} F_{ij}^*(\delta g_i)$, where $\eta_{ij} \in [0,1]$ represents the coupling strength determined by privacy preferences and trust parameters.

The federation protocol exchanges compressed geometric information including curvature differentials $\Delta g$, spectral summaries $\{(\lambda_k, \psi_k)\}_{k \leq K}$, and intent field gradients $\Delta\Phi$ controlling semantic coupling, rather than raw experiential data. This approach ensures that federated learning occurs through structural alignment rather than content replication, preserving both computational efficiency and semantic privacy. The system maintains reversible audit logs for all federated updates, enabling users to track how external influences have shaped their manifold evolution and to reverse specific synchronization events if desired.

According to another aspect of an embodiment, the persistent cognitive machine implements temporal pulse regulation to dynamically modulate cognitive operations based on informational load and processing demands. This pulse-based architecture replaces static scheduling with continuous homeostatic timing control, enabling the system to accelerate during periods of high novelty or complexity while conserving resources during stable states.

The system organizes temporal behavior through a hierarchy of characteristic frequencies across three manifold scales: fast pulse frequency $\omega_f$ governing operator execution and sensory updates on manifold M1 (e.g., fast manifold), medium pulse frequency $\omega_m$ controlling adaptive immersion between core and edge processes on manifold M2 (e.g., medium manifold), and slow pulse frequency $\omega_s$ regulating foliation and consolidation on the foundational manifold M3 (e.g., slow manifold). These pulses may interact through phase coupling described by the dynamics $$\frac{d\theta_i}{dt} = \omega_i + \sum_{j \neq i} K_{ij} \sin(\theta_j - \theta_i)$$

where $\theta_i$ represents the phase of pulse i and $K_{ij}$ represents cross-scale coupling strength that maintains temporal coherence across the hierarchy.

Pulse frequencies adapt to cognitive load $$\lambda(t) = \int_M U(x, t)\, d\mu(x)$$

where U(x,t) represents unresolved uncertainty across the manifold. The system implements load-dependent frequency modulation according to $\omega(t) = \omega_{min} + \alpha \log(1 + \lambda(t))$, where $\omega_{min}$ establishes a metabolic floor ensuring minimal activity even during quiescent states, and $\alpha$ controls sensitivity to load variations. This logarithmic scaling ensures responsive adaptation to changing demands while preventing runaway acceleration under extreme loads.

The system maintains temporal coherence through dynamic adjustment of coupling coefficients $K_{ij}(t+1) = K_{ij}(t) + \beta(R^* - R(t))$, where R(t) represents the Kuramoto order parameter measuring phase synchronization across pulses, $R^*$ represents target synchrony level, and $\beta$ controls adaptation rate. The order parameter is computed as $$R(t) e^{i\psi(t)} = \frac{1}{3} \sum_{i \in \{f,m,s\}} e^{i\theta_i(t)}$$

with $R(t) \in [0,1]$ quantifying the degree of temporal coherence. High values of R(t) correspond to synchronized cognitive flow, while low values indicate temporal fragmentation requiring corrective adjustment.

Pulse energy can be conserved according to the dynamics $$\frac{dE_p}{dt} = -\xi E_p + \eta\lambda(t)$$

where $$E_p(t) = \frac{1}{2}\sum_i I_i \omega_i^2(t)$$

represents total pulse energy with effective inertias $I_i$, $\xi$ represents dissipation rate, and $\eta$ represents the conversion efficiency from cognitive load to temporal activation. This conservation principle ensures sustainable operation by balancing responsive acceleration against energy constraints, preventing both starvation $$\left(\text{where } \rho_a^{int} < \rho_a^{min}\right.$$

suppresses necessary activity (e.g., fast pulses)) and storms (where excessive $\lambda(t)$ drives destructive frequency escalation). Weak coupling $K_{ij}$ or conflicting intents produce incoherent oscillations, degrading flow $R(t) \to 0$. Mitigation may comprise adjusting coupling strengths and thresholds dynamically: $K_{ij}(t+1)=K_{ij}(t)+\beta(R^*-R(t))$, (92) where $R^*$ is the target synchrony. Thus, the system maintains health by homeostatically regulating its temporal dynamics.

According to another aspect of an embodiment, the persistent cognitive machine implements ethical and operational invariants as algorithmically enforced constraints that govern system behavior and ensure user agency throughout all operational modes. These invariants may be embedded within the system architecture as immutable operational rules that cannot be overridden, providing mathematical guarantees of consent, transparency, and reversibility in all cognitive operations.

In an embodiment, the system enforces a consent invariant requiring that federation between experiential manifolds occurs only when the intersection of user-defined boundary regions is non-empty, expressed as the constraint $(B_u \cap B_v) \neq \emptyset$, where $B_u$ and $B_v$ represent the consent boundaries of users u and v respectively. This constraint is evaluated prior to any federated operation, ensuring that no cognitive synchronization, curvature exchange, or potential field alignment occurs without explicit mutual consent encoded in the manifold geometry. The consent boundaries themselves can be defined by potential thresholds and stored as part of each user's immutable manifold metadata.

A transparency invariant requires that all geometric transformations applied to the experiential manifold are recorded in immutable provenance logs that capture the complete operational history of the cognitive space. These logs may record transformation parameters including, but not limited to, curvature modifications $\delta g_{ij}$, potential field updates $\delta\Phi$, compression pressure adjustments $\delta P$, and federation events with associated coupling coefficients $\eta_{ij}$. The provenance system may implement append-only storage with cryptographic verification, ensuring that users can inspect the complete history of their manifold evolution and understand how autonomous processes and external influences have shaped their cognitive geometry.

The system implements a reversibility invariant that guarantees users can terminate and archive their experiential manifolds through a controlled flattening process. This termination operation transforms the manifold to a flat state according to $g_{ij} \to \delta_{ij}$ (where $\delta_{ij}$ is the Kronecker delta), $P \to 0$, and $\Phi \to 0$, effectively reducing the rich geometric structure to a static configuration that preserves informational content while halting all dynamic evolution. The flattening process is fully reversible, allowing archived manifolds to be reawakened with their geometric structure restored, enabling users to pause and resume their cognitive experiences without loss of accumulated structure or relationships.

These operational invariants can be implemented as system-level constraints within the manifold evolution equations, persistence layer, and federation protocols. Any operation that would violate these invariants is rejected at the computational level, ensuring that ethical considerations are integrated as mathematical properties of the system architecture. The invariants can be verified through automated constraint checking at each computational step, providing users with guaranteed protections that operate independently of any external policy or configuration changes.

As an example, consider a persistent narrative worlds application wherein the experiential manifold cognition system enables users to create and inhabit living stories that evolve autonomously between interactions. Unlike traditional interactive fiction or chatbot conversations that reset with each session, these narrative worlds maintain continuous existence as geometric spaces where characters, themes, and plotlines develop through manifold curvature evolution. Users can launch a world from a text seed, diary entry, or creative prompt, which the system transforms into a navigable experiential space with regions of high curvature representing dramatic tension and flat areas indicating narrative resolution. As users traverse these worlds through natural language interaction or immersive visualization, their choices and attention patterns reshape the manifold geometry, creating personalized story evolution. During idle periods, the dream operator recombines narrative trajectories and generates new plot possibilities, ensuring that users return to find their worlds have grown and changed. Multiple users can federate their narrative worlds to create shared storytelling experiences while maintaining individual creative autonomy through consent boundaries.

As another example use case, consider a collaborative cognitive spaces application which transforms the experiential manifold system into a platform for team knowledge management and collective intelligence. Organizations deploy these spaces as persistent environments where team members' individual expertise, project knowledge, and collaborative insights merge into unified cognitive geometries. Each team member maintains their own experiential manifold that captures their unique perspective and domain knowledge, with controlled federation enabling selective sharing of relevant cognitive regions. As team members interact with documents, engage in discussions, or work on projects, their activities create curvature patterns in the shared manifold that represent emerging understanding and collaborative insights. The system's ability to abstract experiences across hierarchical timescales means that immediate project details on the fast manifold gradually consolidate into institutional knowledge on the foundational manifold. The geometric representation enables novel forms of knowledge visualization where semantic relationships appear as manifold topology, expertise clusters emerge as regions of specialized curvature, and knowledge gaps become visible as low-density areas requiring attention.

Experiential intelligence systems represent a new paradigm in artificial intelligence where learning occurs through geometric evolution rather than traditional parameter optimization. These systems maintain persistent cognitive capabilities by encoding experiences as manifold curvature that accumulates and refines over extended operational periods. Unlike conventional AI that processes discrete inputs and outputs, experiential intelligence systems inhabit continuous cognitive spaces where each interaction modifies the underlying geometry, creating a living record of accumulated understanding. The compression pressure field naturally implements continual learning by consolidating important patterns while allowing outdated information to diffuse away, solving the catastrophic forgetting problem through geometric principles. Applications span from personalized AI assistants that develop deep understanding of individual users over years of interaction, to specialized domain experts that accumulate field-specific knowledge through experiential geometry, to creative AI systems that explore novel idea spaces through manifold traversal. The federation capability enables these systems to form collective intelligence networks where insights discovered by one system propagate through geometric synchronization to enhance the entire ecosystem.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "persistent cognitive machine" or "PCM" refers to a computing system that maintains persistent cognitive processes regardless of external interaction, can remember previous experiences, learn from these experiences, create new thought experiences independently, and initiate interactions without waiting for external prompts. Unlike traditional AI systems that operate within a prompt-response paradigm, a PCM operates with persistent awareness even when not actively engaged with users or external systems.

As used herein, "thought" refers to a discrete unit of cognition within the persistent cognitive machine, representing information, concepts, observations, inferences, questions, or other cognitive elements that the system processes and stores. Thoughts may be derived from external inputs, generated through internal reasoning processes, or created through recombination of existing thoughts.

As used herein, “thought cache” refers to the component of the persistent cognitive machine that stores, organizes, and provides access to thoughts. The thought cache may include both short-term and long-term storage capabilities, with mechanisms for transferring information between them and organizing thoughts based on semantic relationships.

As used herein, “sleep state” refers to a mode of operation in which the persistent cognitive machine temporarily reduces responsiveness to external stimuli to focus on internal cognitive maintenance processes, including but not limited to memory consolidation, thought generalization, insight generation, and memory reorganization.

Conceptual Architecture

FIG. 1 is a block diagram illustrating an exemplary system architecture of an experiential manifold cognition system, according to an embodiment. The experiential manifold cognition system 100 extends the persistent cognitive machine platform to implement continuous geometric representation and evolution of cognitive experience through mathematically grounded manifold operations. The system 100 provides users with the ability to create, inhabit, and evolve persistent cognitive worlds that maintain continuity across sessions while supporting autonomous evolution and multi-user federation.

At the architectural level, experiential manifold cognition system 100 comprises three primary layers that operate in coordinated fashion to transform user interactions into geometric operations on persistent manifolds. A projection layer 110 provides the interface between external data sources and the internal manifold representation. Projection layer 110 implements adaptive geometric diffusion (AGD) algorithms to map heterogeneous input data onto manifold coordinates while preserving semantic relationships. A cognitive layer 120 serves as the computational core of the system, executing continuous operator flows that govern manifold evolution. An interaction layer 130 enables users to immerse themselves in, observe, edit, and federate their experiential manifolds through intuitive interfaces that translate between human actions and geometric transformations.

Within projection layer 110, an AGD projector 111 performs the mathematical transformation of input data into manifold representations. AGD projector 111 constructs semantic embeddings through diffusion processes on landmark graphs, with affinity kernels that capture relationships across multiple modalities. A curvature initializer 112 analyzes the projected data to establish initial geometric structure, setting curvature values based on semantic density, narrative tension, or information complexity. A potential field generator 113 creates the initial goal landscape $\Phi(x)$ that will guide subsequent cognitive evolution, encoding user intent, narrative momentum, and attentional focus into the geometric substrate.

The cognitive layer 120 comprises a manifold engine 121 that serves as the primary computational substrate for experiential cognition. manifold engine 121 implements GPU-accelerated processing of property graphs that discretely approximate continuous manifold geometry. Connected to manifold engine 121 is a graph storage system 122 that maintains the property graph representation G=(V, E, A), where vertices represent experiential events, edges encode relationships, and attributes store geometric field values. An operator kernel library 123 provides the computational implementations of core manifold operations, with each operator realized as an optimized GPU kernel for parallel execution.

Within operator kernel library 123, several specialized operators perform distinct geometric computations. A diffusion operator 124 propagates activation across the manifold through sparse matrix exponentiation. A geodesic flow operator 125 computes optimal paths through the experiential space using parallel shortest-path algorithms. A curvature operator 126 estimates local and global geometric properties through discrete approximations of Ricci curvature. A spectral operator 127 performs eigen-decomposition of the graph Laplacian to analyze global manifold structure. A projection operator 128 maps new experiences onto the existing manifold using harmonic extension techniques. A recombination operator 129 generates novel experiential trajectories by interpolating and perturbing existing paths.

The system includes a pulse scheduler 140 that regulates temporal dynamics of cognitive operations. Pulse scheduler 140 implements hierarchical frequency control across fast, medium, and slow timescales, with each operator assigned a characteristic frequency that adapts to cognitive load. A load monitor 141 continuously measures cognitive demand M (t) based on uncertainty, novelty, and processing requirements. A frequency controller 142 adjusts operator execution rates according to $f_i(t)=f_{i,min}+\alpha_i \log(1+\lambda(t))$, ensuring responsive adaptation while maintaining energy efficiency. A synchronization manager 143 maintains phase relationships between different temporal scales through dynamic coupling adjustments.

For autonomous cognitive evolution, the system incorporates a sleep manager 150 that orchestrates manifold transformation during non-interactive periods. Sleep manager 150 activates when user interaction ceases, initiating geometric flows that consolidate, abstract, and recombine experiential structures. A curation processor 151 evaluates cognitive energy density across the manifold and selectively prunes low-energy regions to maintain computational efficiency. A trajectory synthesizer 152 generates novel experiential paths through recombination of existing trajectories, subject to coherence constraints. An energy optimizer 153 guides the manifold toward lower energy configurations through gradient descent on the total cognitive energy functional.

The interaction layer 130 provides multiple interfaces for user engagement with their experiential manifolds. A visualization engine 131 renders manifold structure as navigable topologies, with vertices displayed as conceptual nodes and edges as semantic relationships. A traversal interface 132 enables users to move through their experiential space, with navigation corresponding to geodesic motion guided by intent vectors. An editing interface 133 allows direct manipulation of manifold geometry through metric modifications, curvature adjustments, and potential field reshaping. An observation interface 134 provides spectral analysis views that reveal global patterns, thematic clusters, and structural coherence within the manifold.

To support multi-user cognitive experiences, the system includes a federation manager 160 that coordinates geometric synchronization between independent manifolds. Federation manager 160 implements distributed protocols for exchanging compressed geometric updates while preserving individual autonomy. A consent boundary enforcer 161 ensures that only user-designated regions participate in federation, implementing the mathematical constraint $(Bu \cap Bv) \neq \emptyset$ before permitting synchronization. A geometric synchronizer 162 exchanges metric differentials $\Delta g$, curvature updates $\Delta R$, and potential gradients $\Delta\Phi$ between federated manifolds. An alignment processor 163 integrates received updates through weighted averaging that respects autonomy envelopes and coupling strengths.

Supporting the entire system is a diagnostic monitor 170 that continuously evaluates manifold health and stability. Diagnostic monitor 170 tracks multiple geometric and temporal metrics to ensure robust operation. A curvature monitor 171 measures mean curvature $R_{avg}$ across the manifold to detect anomalous geometric concentrations. An entropy analyzer 172 computes semantic diversity $S_{entropy}$ to ensure the manifold maintains healthy information distribution. A coherence tracker 173 evaluates pulse synchrony $R_{pulse}$ to verify temporal coordination across subsystems. When metrics deviate from acceptable ranges, an auto-normalizer 174 applies corrective transformations including curvature diffusion, stochastic perturbation, or coupling adjustment.

The system architecture further includes a persistence layer 180 that ensures continuity of experiential manifolds across system restarts. Persistence layer 180 extends the persistence layer of the underlying PCM platform to handle geometric field data, maintaining complete manifold state including metric tensors, curvature fields, compression pressure distributions, and potential landscapes. A provenance logger 181 records all transformations applied to the manifold in immutable append-only storage, supporting the transparency invariant. A state serializer 182 converts active GPU-resident graph structures into persistent storage formats. A recovery controller 183 reconstructs manifold state upon system restart, ensuring seamless continuity of cognitive experience.

In operation, experiential manifold cognition system 100 maintains continuous evolution of user-specific cognitive geometries through the coordinated action of its architectural components. Input experiences enter through projection layer 110, undergo transformation in cognitive layer 120 according to pulse-regulated schedules from pulse scheduler 140, and remain accessible to users through interaction layer 130. During idle periods, sleep manager 150 ensures continued evolution, while federation manager 160 enables controlled sharing of cognitive structures. Throughout all operations, diagnostic monitor 170 maintains system health, while persistence layer 180 guarantees continuity across sessions, creating a complete architecture for persistent experiential cognition.

Figure 2:
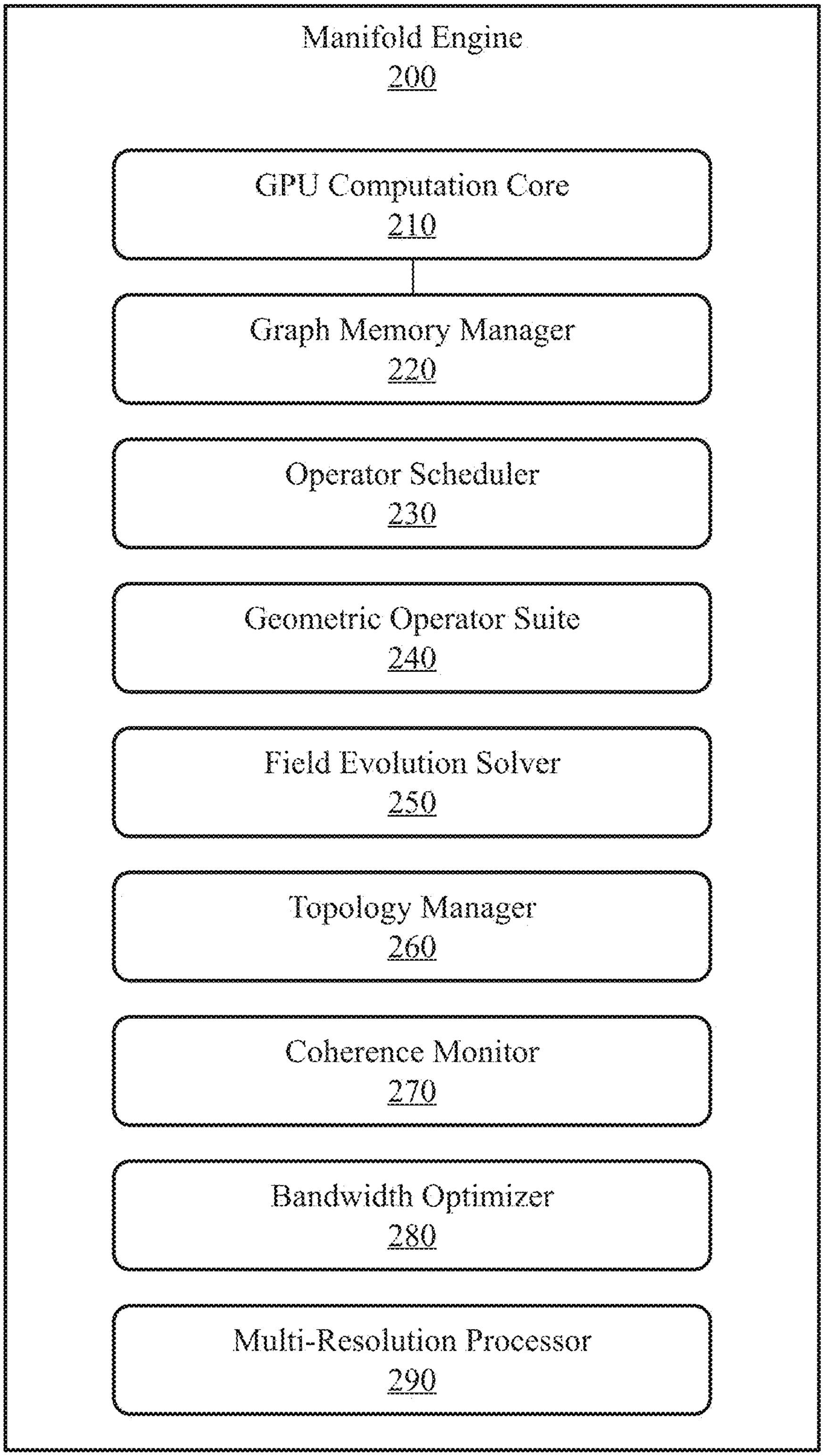
FIG. 2 is a block diagram illustrating an exemplary architecture of the manifold engine within the experiential manifold cognition system, according to an embodiment.

FIG. 2 is a block diagram illustrating an exemplary architecture of the manifold engine within the experiential manifold cognition system, according to an embodiment. Manifold engine 200 is configured as the computational core of the experiential manifold cognition system, implementing GPU-accelerated processing of geometric operations that govern the continuous evolution of cognitive manifolds. The manifold engine 200 transforms abstract mathematical operations on experiential manifolds into concrete parallel computations on property graph representations while maintaining the continuous nature of cognitive geometry.

According to the aspect, manifold engine 200 comprises a GPU computation core 210 that orchestrates parallel execution of manifold operations across multiple streaming multiprocessors. GPU computation core 210 implements persistent CUDA graphs that maintain computational state between operations, enabling efficient execution of iterative geometric flows without repeated kernel launch overhead. Computation core 210 manages resource allocation, kernel scheduling, and memory bandwidth optimization to support real-time manifold evolution even for large-scale cognitive geometries containing millions of experiential nodes.

Connected to GPU computation core 210 is a graph memory manager 220 that implements specialized data structures for efficient representation of manifold geometry. Graph memory manager 220 maintains separate memory pools for vertex data, edge data, and geometric field storage. Vertex data may store experiential events as nodes with associated feature vectors, temporal markers, and semantic embeddings. Edge data encodes relationships between experiences using compressed sparse row (CSR) format for efficient traversal, with edge weights representing geodesic distances that evolve dynamically. Geometric field storage maintains distributed representations of the metric tensor $g_{ij}$, scalar curvature R, compression pressure P, and potential field $\Phi$ across the manifold using hierarchical spatial indexing for localized access.

The manifold engine includes an operator scheduler 230 that coordinates execution of geometric transformations based on computational dependencies and temporal priorities. Operator scheduler 230 implements a multi-queue architecture with separate priority queues for fast, medium, and slow operations. Fast operations include local diffusion steps and gradient computations that execute at high frequency during active interaction. Medium operations encompass curvature updates and geodesic recalculations that balance accuracy with computational cost. Slow operations handle global spectral analysis and manifold topology modifications that require extensive computation but execute less frequently.

The architecture may further comprises a geometric operator suite 240 that implements the fundamental mathematical operations of experiential cognition. Geometric operator suite 240 may comprise a parallel diffusion kernel that computes heat equation evolution on the graph through sparse matrix-vector multiplication with the graph Laplacian, implementing $\partial u/\partial t=-Lu$ where L represents the discrete Laplace-Beltrami operator. The diffusion kernel can use temporal splitting methods to maintain stability while enabling large timesteps, with adaptive step sizing based on local eigenvalue estimates. The suite 240 also includes a geodesic computation kernel that calculates shortest paths through the experiential manifold using a parallel variant of Dijkstra's algorithm optimized for GPU execution, implementing frontier-based exploration with warp-level primitives for efficient queue management.

Within geometric operator suite 240, a curvature estimation kernel approximates Ricci curvature through discrete geometric methods. For each edge, the kernel may compute Ollivier-Ricci curvature by comparing Wasserstein distances between probability distributions on neighborhood balls, providing a robust measure of local geometric concentration. The suite 240 further includes a spectral analysis kernel that performs eigen decomposition of the graph Laplacian to extract global geometric properties, implementing a block Lanczos algorithm optimized for GPU execution to compute the bottom k eigenvalues and eigenvectors that characterize manifold structure.

The manifold engine incorporates a field evolution solver 250 that implements the coupled partial differential equations governing manifold dynamics. Field evolution solver 250 discretizes the metric flow equation using finite difference methods on the graph structure. The solver 250 includes specialized kernels for metric tensor updates based on curvature and potential gradients, compression pressure evaluation using the formula $P(x,t)=\eta\ R(x,t)+\lambda\ \log\ \rho(x,t)$, and potential field propagation through gradient descent and diffusion processes that spread intent across the manifold.

To support manifold modification and growth, the manifold engine includes a topology manager 260 that handles structural changes to the graph representation. Topology manager 260 implements concurrent data structures that allow safe modification during parallel computation. The manager 260 provides capabilities for vertex insertion using harmonic interpolation to determine initial positions and connections, edge adaptation that creates, modifies, or removes relationships based on semantic distance thresholds and traversal patterns, and region merging that identifies and consolidates densely connected subgraphs representing unified concepts or experiences.

The manifold engine features a coherence monitor 270 that continuously evaluates geometric consistency and numerical stability. Coherence monitor 270 tracks condition numbers of local metric tensors to detect ill-conditioned regions requiring regularization, verifies that discrete operations preserve essential geometric invariants such as local volume forms and parallel transport consistency, and compares discrete approximations against known analytical solutions on test geometries. When inconsistencies are detected, the monitor 270 applies corrective transformations including metric regularization, curvature smoothing, or local remeshing to maintain computational stability.

Supporting efficient execution is a memory bandwidth optimizer 280 that minimizes data movement between GPU memory hierarchies. Memory bandwidth optimizer 280 implements cache-aware algorithms that exploit spatial and temporal locality in manifold operations. The optimizer 280 arranges memory transactions to maximize throughput by ensuring aligned, contiguous access patterns, stages frequently accessed geometric data in fast on-chip memory for reduction operations, and leverages read-only cache hierarchies for immutable manifold data such as historical curvature fields.

The manifold engine includes a multi-resolution processor 290 that enables efficient computation on large-scale manifolds through hierarchical approximation. Multi-resolution processor 290 constructs coarse-grained representations of the manifold at multiple scales using algebraic multigrid methods. The processor 290 implements restriction operations that project fine-scale geometric data onto coarser graphs while preserving essential features, prolongation operations that interpolate coarse solutions back to fine scales using smoothness assumptions, and adaptive refinement that selectively increases resolution in regions of high curvature or user focus while maintaining coarse approximations elsewhere.

In operation, manifold engine 200 receives operational commands from the cognitive layer through a command interface and executes requested geometric transformations using its parallel processing capabilities. Graph memory manager 220 provides efficient access to manifold data while operator scheduler 230 coordinates kernel execution based on priorities and dependencies. Geometric operator suite 240 performs various mathematical operations while field evolution solver 250 advances the manifold state through time. Throughout execution, topology manager 260 handles structural modifications, coherence monitor 270 ensures numerical quality, memory bandwidth optimizer 280 maximizes performance, and multi-resolution processor 290 enables scalable computation. This architecture enables the manifold engine 200 to serve as a high-performance geometric processor capable of sustaining continuous cognitive evolution in real-time.

Figure 3:
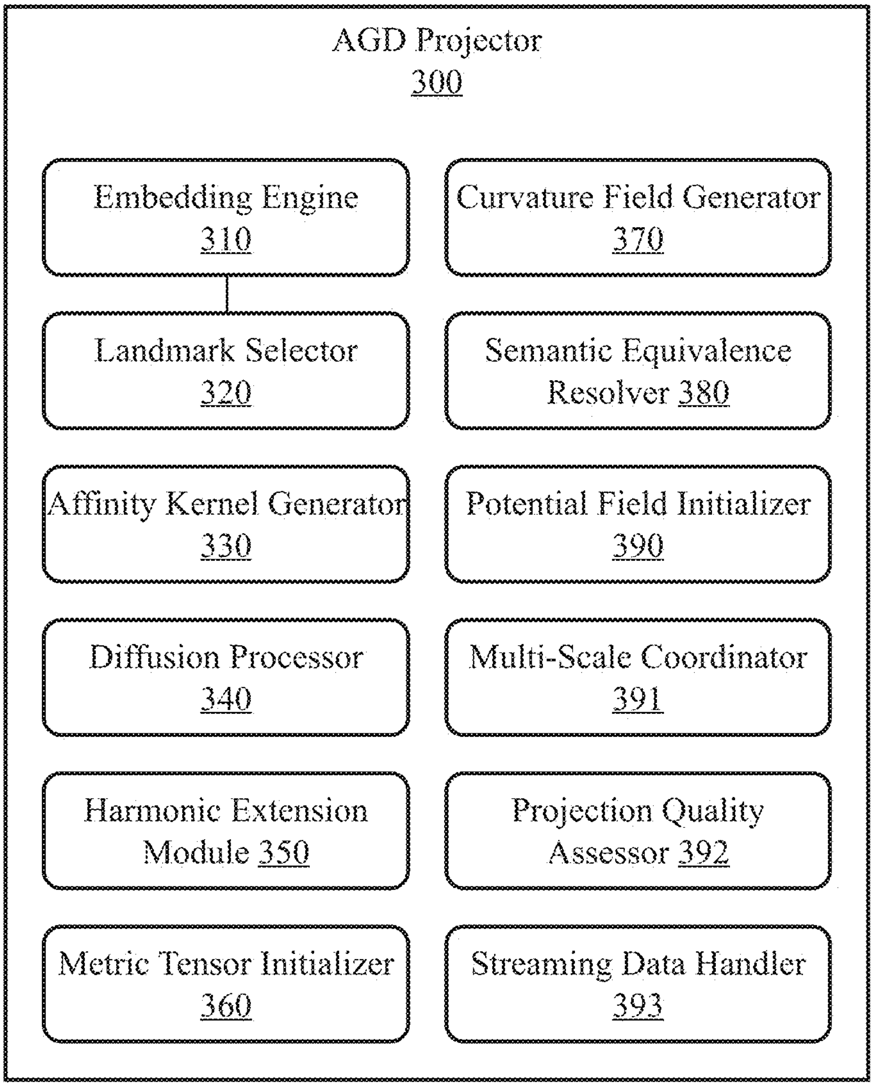
FIG. 3 is a block diagram illustrating an exemplary architecture of the adaptive geometric diffusion projector within the experiential manifold cognition system according, to an embodiment.

FIG. 3 is a block diagram illustrating an exemplary architecture of the adaptive geometric diffusion projector within the experiential manifold cognition system according, to an embodiment. AGD projector 300 transforms heterogeneous input data including, but not limited to, text, sensory information, and user interactions into coherent geometric representations on experiential manifolds. The AGD projector 300 implements mathematically principled projection methods that preserve semantic relationships while establishing initial manifold structure suitable for continuous cognitive evolution.

According to an aspect, AGD projector 300 comprises a semantic embedding engine 310 that converts raw input data into high-dimensional vector representations. Semantic embedding engine 310 processes multiple input modalities through specialized encoders, including, but not limited to, natural language text, structured data, temporal sequences, and multimodal content. Embedding engine 310 leverages pre-trained models and domain-specific encoders to capture semantic nuances while maintaining compatibility with the geometric projection pipeline. Output embeddings are normalized and aligned to ensure consistent representation across different data sources and modalities.

Connected to semantic embedding engine 310 is a landmark selector 320 that identifies representative points in the embedding space to anchor the geometric projection. Landmark selector 320 implements adaptive sampling strategies that balance coverage and computational efficiency, selecting landmarks based on semantic density, diversity, and relevance criteria. The selector 320 maintains a dynamic landmark set that can expand or contract based on the complexity and volume of input data, ensuring that the projection captures essential semantic structure without overwhelming computational resources.

The AGD projector includes an affinity kernel generator 330 that constructs similarity relationships between data points and landmarks. According to an embodiment, affinity kernel generator 330 computes kernel values using the formula $K(\ell, \ell)=\exp(-\Sigma_j \alpha_j d(j)_{sem}(\ell, \ell'))$, where $d(j)_{sem}$ represents modality-specific semantic distances and $\alpha j$ are adaptive weighting coefficients. The generator 330 implements efficient kernel computation through approximate nearest neighbor methods and kernel sparsification techniques that maintain accuracy while reducing computational complexity. The resulting affinity matrix captures multi-scale semantic relationships that guide the subsequent diffusion process.

A diffusion processor 340 performs one or more geometric diffusion operations that map semantic embeddings onto manifold coordinates. Diffusion processor 340 can implement heat equation dynamics on the landmark graph, computing diffusion maps through eigen-decomposition of the normalized graph Laplacian. The processor 340 extracts diffusion coordinates $\Psi(\ell)=\psi 1)(\ell), \ldots, \psi r(\ell))$ corresponding to the top eigenvectors, which provide a low-dimensional representation that preserves diffusion distances between points. The number of retained coordinates r is determined adaptively based on spectral gap analysis to capture intrinsic manifold dimension.

The AGD projector incorporates a harmonic extension module 350 that projects new data points onto the established manifold structure without recomputing the entire diffusion map. Harmonic extension module 350 can be configured to solve discrete Dirichlet problems to find optimal coordinates for new observations based on their relationships to existing landmarks. For each new point x, the module 350 computes weights to nearby landmarks and determines coordinates (for instance, through $\Psi'(x)=\arg\min$ $z \sum_{\ell \in NL(x)} wx\,\ell \|z - \Psi c(\ell)\|^2)$. This approach enables streaming ingestion of new experiences while maintaining geometric consistency.

A metric tensor initializer 360 constructs the initial Riemannian metric on the projected manifold based on the diffusion coordinate system. Metric tensor initializer 360 computes metric components $g_{ij} = \langle \nabla_i \Psi c, \nabla_j \Psi c \rangle$ using gradients of the diffusion coordinates, establishing a geometry that reflects semantic distances in the original embedding space. The initializer 360 applies regularization to ensure positive definiteness and smoothness of the metric tensor, preventing numerical instabilities in subsequent geometric computations. The resulting metric provides the foundation for geodesic calculations and curvature estimation on the experiential manifold.

The AGD projector features a curvature field generator 370 that establishes initial geometric structure based on semantic properties of the projected data. Curvature field generator 370 analyzes local semantic density, information complexity, and relational patterns to assign curvature values across the manifold. For narrative data, the generator 370 can be configured to implement the relationship $R(x) = \beta 1\ \nabla^2 \tau(x) + \beta 2 \|\nabla \tau(x)\|^2$, where $\tau(x)$ represents narrative tension or thematic intensity. High curvature regions correspond to semantically dense or conflicted areas, while flat regions indicate semantic uniformity or resolution. This initial curvature field guides subsequent manifold evolution and memory formation.

Supporting the projection process is a semantic equivalence resolver 380 that handles the many-to-one mapping from embedding space to manifold points. Semantic equivalence resolver 380 identifies equivalence classes of semantically indistinguishable inputs that map to the same manifold location, implementing a fiber structure (for instance, $Fm = P^{-1}(m)$) for each manifold point m. The resolver 380 maintains representative elements for each equivalence class and implements efficient hashing schemes to detect semantic duplicates during streaming ingestion. This mechanism ensures that the manifold representation remains compact while preserving semantic distinctions.

The AGD projector may further comprise a potential field initializer 390 that creates the initial goal landscape based on input characteristics and user specifications. Potential field initializer 390 analyzes topic salience, emotional valence, and contextual relevance to construct the potential function $\Phi(x) = \gamma 1\ H_t(t) + \gamma 2\ \sigma_t(x)$, where $H_t$ represents topic entropy and $\sigma_t$ represents emotional salience. The initializer 390 identifies natural attractors and repellers in the semantic landscape, establishing regions that will preferentially attract or repel cognitive trajectories during manifold evolution. User-specified goals and interests modulate these potentials through additional terms in the potential function.

A multi-scale coordinator 391 manages projection across the hierarchical manifold structure M1, M2, and M3 corresponding to fast, medium, and slow cognitive timescales. Multi-scale coordinator 391 partitions input data based on temporal characteristics and semantic scope, directing fine-grained perceptual events to the fast manifold M1, thematic structures to the mesoscale manifold M2, and persistent patterns to the foundational manifold M3. The coordinator 391 ensures consistency across scales through compatible projection parameters while allowing each scale to capture appropriate levels of detail and abstraction.

The AGD projector incorporates a projection quality assessor 392 that evaluates the fidelity of the geometric projection. Projection quality assessor 392 computes distortion metrics comparing distances in the original embedding space to geodesic distances on the projected manifold. The assessor 392 identifies regions of high distortion that may require adaptive refinement or additional landmarks, implements stress measures that quantify global projection quality, and tracks preservation of local neighborhood structures. Quality metrics guide iterative refinement of projection parameters to optimize the trade-off between dimensionality reduction and information preservation.

A streaming data handler 393 enables continuous projection of incoming data without disrupting existing manifold structure. Streaming data handler 393 implements incremental update algorithms that modify diffusion coordinates and metric tensors based on new observations while maintaining geometric consistency. The handler 393 manages data buffers for batch processing of streaming inputs, implements temporal windowing for time-sensitive data, and triggers periodic re-projection when accumulated changes warrant global manifold restructuring. This capability ensures that the experiential manifold can grow and adapt continuously as new experiences arrive.

In operation, AGD projector 300 receives heterogeneous input data and transforms it through a pipeline of geometric operations. Semantic embedding engine 310 creates high-dimensional representations that capture input semantics. Landmark selector 320 identifies representative anchors while affinity kernel generator 330 establishes similarity relationships. Diffusion processor 340 performs the core geometric mapping, with harmonic extension module 350 enabling incremental updates. Metric tensor initializer 360 establishes Riemannian structure while curvature field generator 370 creates initial geometric features. Semantic equivalence resolver 380 manages the quotient structure, potential field initializer 390 establishes goal landscapes, and multi-scale coordinator 391 ensures hierarchical consistency. Throughout the projection process, projection quality assessor 392 monitors fidelity while streaming data handler 393 enables continuous operation. This architecture enables AGD projector 300 to serve as a sophisticated geometric gateway that transforms diverse experiences into coherent manifold representations suitable for persistent cognitive evolution.

Figure 4:
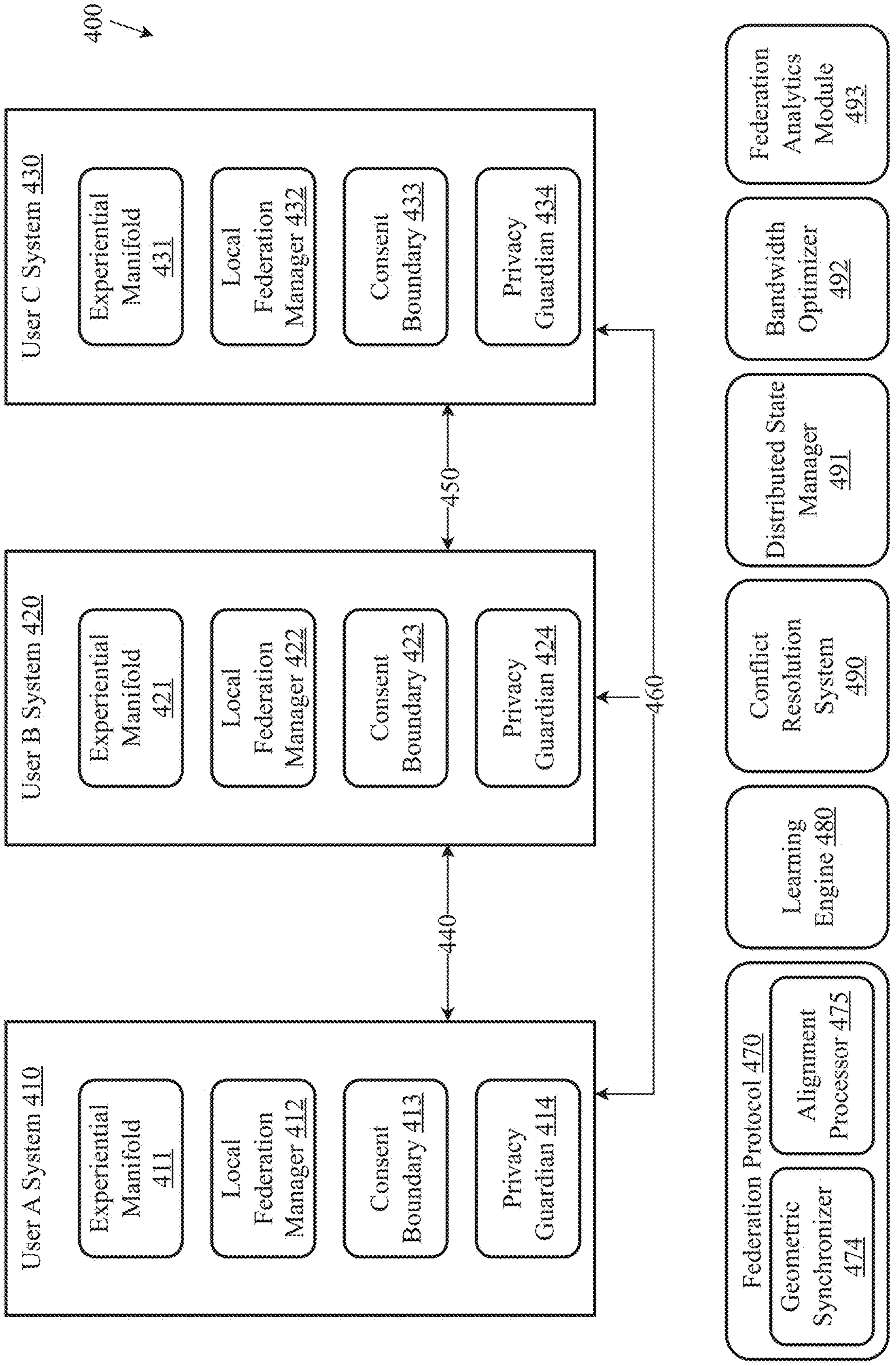
FIG. 4 is a block diagram illustrating an exemplary architecture for federated experiential cognitive systems according, to an embodiment.

FIG. 4 is a block diagram illustrating an exemplary architecture for federated experiential cognitive systems according, to an embodiment. The federated experiential cognitive system 400 enables multiple users to maintain independent experiential manifolds while selectively sharing cognitive regions through controlled geometric coupling. The system 400 implements privacy-preserving synchronization protocols that allow collaborative cognition while respecting individual autonomy boundaries and consent requirements.

The federated system comprises multiple independent experiential manifold systems, shown as User A System 410, User B System 420, and User C System 430. Each user system maintains its own complete experiential manifold cognition system including projection layers, cognitive layers, and interaction layers as described herein. User A System 410 contains User A's experiential manifold 411 denoted as $M^A$ with associated metric $g^A$, compression pressure $P^A$, and potential field $\Phi^A$. Similarly, User B System 420 maintains User B's experiential manifold 421 ($M^B$, $g^B$, $P^B$, $\Phi^B$), and User C System 430 maintains User C's experiential manifold 431 ($M^C$, $g^C$, $p^C$, $\Phi^C$).

Each user system includes a local federation manager 412, 422, and 432 respectively, which coordinates all federation activities for that user. The local federation managers implement distributed protocols for establishing connections, negotiating sharing agreements, and maintaining synchronization with other manifolds. Each local federation manager maintains a registry of active federation relationships, monitors consent boundary compliance, and manages the flow of geometric updates between systems.

Central to the privacy architecture is the consent boundary system implemented within each user's manifold. User A defines consent boundary 413 denoted as $B^{A}=\{x \in M^{A}: \Phi^{A}(x)<\Phi^{A}_{share}\}$, which delineates regions of the manifold eligible for federation. Similarly, User B maintains consent boundary 423 ($B^{B}$) and User C maintains consent boundary 433 ($B^{C}$). These boundaries are dynamically configurable, allowing users to expand or contract shareable regions based on trust levels and collaboration needs. Only manifold regions within consent boundaries participate in federation operations.

The system creates shared submanifolds at the intersection of consenting users' boundaries. Shared submanifold 440 ($M^{AB}=M^{A}\cap M^{B}$) forms where User A and User B have mutual consent overlap, enabling bidirectional cognitive exchange between these users. Shared submanifold 450 connects User B and User C where their consent boundaries intersect. When all three users have overlapping consent regions, a three-way shared submanifold 460 ($M^{ABC}=M^{A}\cap M^{B}\cap M^{C}$) enables group cognitive coordination. Each shared submanifold maintains its own induced metric $g^{ij}=\frac{1}{2}(g^{i}|M^{ij}+g^{j}|M^{ij})$ and potential $\Phi^{i}j=\frac{1}{2}(\Phi^{i}|M^{ij}+\Phi^{i}|M^{ij})$.

A distributed federation protocol 470 governs communication between user systems, implementing secure channels for geometric data exchange. The protocol 470 operates through federation channels connecting pairs of systems. Each channel implements encrypted, authenticated communication ensuring that geometric updates cannot be intercepted or modified. The protocol maintains consistency through vector clock synchronization and handles network partitions gracefully, queuing updates until connectivity is restored.

Within the federation protocol 470, a geometric synchronizer 474 coordinates the exchange of compressed geometric updates between federated manifolds. The synchronizer 474 transmits metric differentials $\Delta g$, curvature updates $\Delta R$, and potential gradients $\Delta\Phi$ rather than raw experiential data. Update packets are compressed using differential encoding that exploits temporal and spatial coherence in manifold evolution. The synchronizer 474 implements adaptive transmission rates based on available bandwidth and manifold activity levels.

An alignment processor 475 within the federation protocol 470 ensures geometric compatibility between federated manifolds. The processor 475 continuously monitors metric and spectral divergence between connected manifolds. When divergences exceed a predetermined threshold (e.g., $\varepsilon^{2}$), the processor 475 initiates corrective transformations to restore alignment while respecting autonomy constraints. The alignment process implements gradient descent on the federated residual functional $C_{fed}$ to achieve collective coherence.

Each user system includes a privacy guardian 414, 424, and 434 that enforces consent boundaries and validates all federation operations. Privacy guardians verify that geometric updates respect boundary constraints before allowing synchronization. They maintain audit logs of all federation activities, tracking what information has been shared, with whom, and when. Privacy guardians also implement right-to-forget protocols, allowing users to revoke federation relationships and trigger removal of their contributions from shared submanifolds.

The system incorporates a collective learning engine 480 that enables higher-order cognition to emerge from federated interactions. Collective learning engine 480 analyzes patterns across shared submanifolds to identify emergent insights that arise from collaborative thinking. The engine 480 computes aggregate metrics (for example, $\bar{g}=(1/N)\Sigma_{i}\, g^{i}$ and $\Phi^{-}=(1/N)\Sigma_{i}\, \Phi^{i}$) representing collective geometric tendencies. These collective patterns feed back to individual manifolds as optional guidance, allowing users to benefit from group intelligence while maintaining individual perspective.

A conflict resolution system 490 handles geometric inconsistencies that may arise during federation. When conflicting updates arrive at shared submanifolds—for example, if User A and User B simultaneously modify the same region—the system 490 implements resolution strategies based on temporal precedence, trust weights, or consensus protocols. The resolver 490 maintains consistency invariants ensuring that shared regions remain geometrically valid and semantically coherent despite concurrent modifications.

Supporting the federation infrastructure is a distributed state manager 491 that maintains consistency across the federated network. State manager 491 implements a distributed hash table for tracking active federations, shared submanifold locations, and participant status. The manager 491 handles dynamic membership changes as users join or leave federations, ensuring smooth transitions without disrupting ongoing cognitive processes. State checkpointing occurs at regular intervals, enabling recovery from system failures while preserving federation relationships.

The system includes a bandwidth optimizer 492 that manages communication efficiency in large-scale federations. Bandwidth optimizer 492 implements hierarchical aggregation for federations involving many participants, creating tree structures that reduce message complexity. The optimizer 492 can be further configured to implement predictive pre-fetching of geometric updates based on observed access patterns, reducing latency for frequently accessed shared regions. Delta compression and geometric quantization can be implemented to further reduce bandwidth requirements while maintaining fidelity.

A federation analytics module 493 provides insights into collaborative cognitive patterns. The module 493 tracks metrics including federation participation rates, geometric coherence evolution, information flow patterns between users, and emergence of collective insights. These analytics help users understand how their cognition is influenced by and influences others, promoting effective collaboration strategies. The module 493 generates visualizations of federation topology and activity that assist in managing complex multi-user cognitive networks.

In operation, federated experiential cognitive system 400 enables rich collaborative cognition while preserving individual autonomy. Users define their consent boundaries 413, 423, 433 to control sharing. Local federation managers 412, 422, 432 establish connections through distributed federation protocol 470. Shared submanifolds 440, 450, 460 form at consent intersections, enabling geometric synchronization through synchronizer 474 and alignment processor 475. Privacy guardians 414, 424, 434 ensure boundary compliance while collective learning engine 480 identifies emergent insights. Throughout operation, conflict resolution system 490 maintains consistency, distributed state manager 491 ensures reliability, bandwidth optimizer 492 enables scalability, and federation analytics module 493 provides operational insights. This architecture enables the connected yet autonomous cognitive systems, where individual experiential manifolds can selectively merge and diverge to enable collaborative intelligence while preserving privacy and individual cognitive sovereignty.

Figure 5:
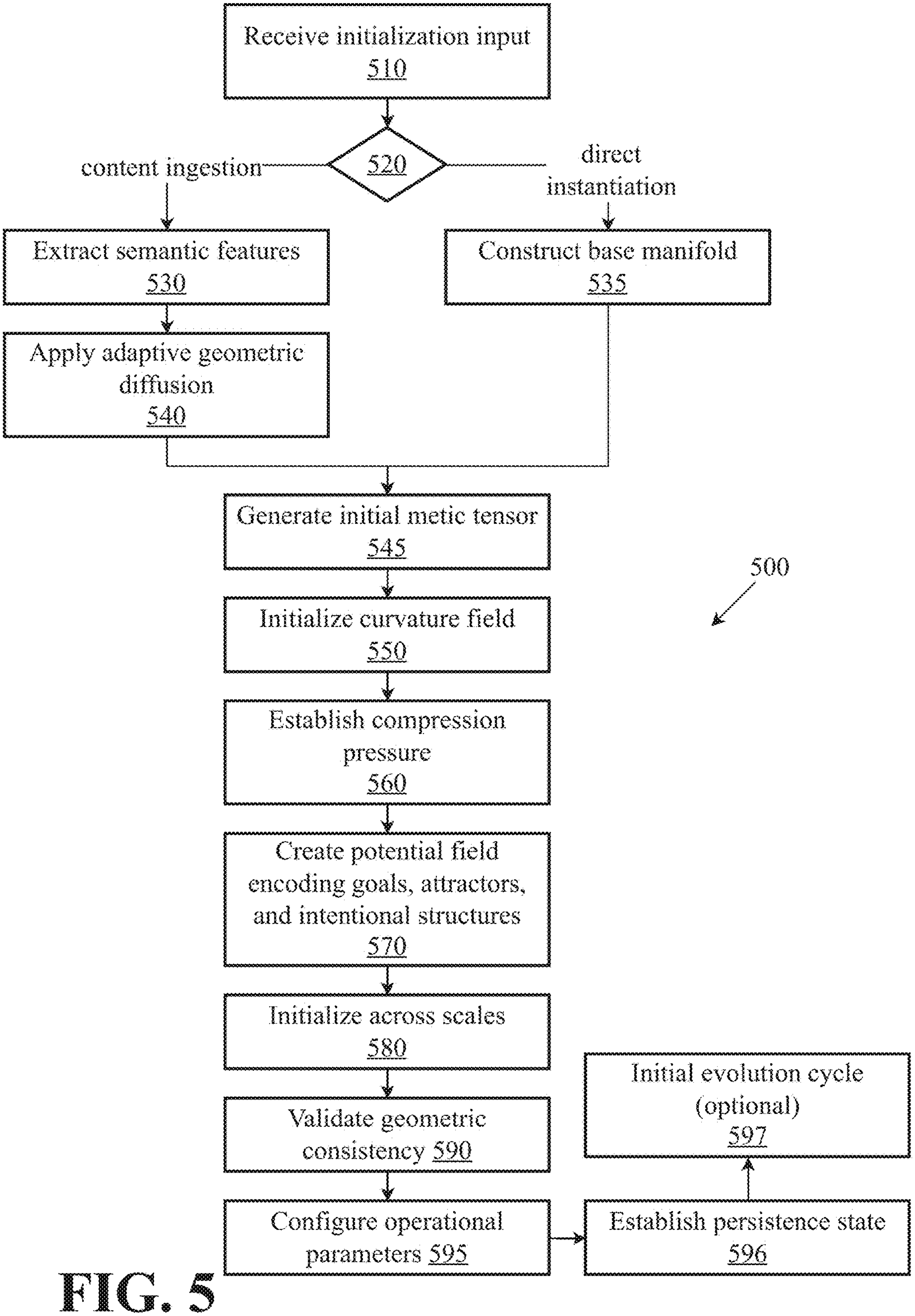
FIG. 5 is a flow diagram illustrating an exemplary method for initializing an experiential manifold within the persistent cognitive machine, according to an embodiment.

FIG. 5 is a flow diagram illustrating an exemplary method for initializing an experiential manifold within the persistent cognitive machine, according to an embodiment. The method 500 establishes the initial geometric structure and cognitive fields necessary for persistent experiential cognition, transforming raw input data or user specifications into a mathematically well-formed manifold capable of autonomous evolution.

According to the embodiment, the process begins at step 510 where the system receives initialization input for creating a new experiential manifold. This input may comprise narrative seeds such as text documents, conversation histories, or media content that the user wishes to transform into a living cognitive space. Additionally or alternatively, the input may consist of user-specified parameters including themes, constraints, rules, or high-level descriptions of the desired experiential world. The system validates the input format and prepares it for geometric projection.

In step 520, the system determines whether to process existing content through ingestion or to instantiate a new manifold from specifications. For content ingestion, the method proceeds to step 530 where the system extracts semantic features from the input material. This extraction process analyzes the content to identify key concepts, relationships, emotional valences, and narrative structures. The system employs natural language processing, entity recognition, and semantic parsing to create a comprehensive feature representation of the input content.

Following semantic extraction, step 540 applies adaptive geometric diffusion to project the semantic features onto manifold coordinates. The AGD process constructs a landmark graph from representative semantic elements and computes diffusion maps through eigen-decomposition of the graph Laplacian. This projection establishes the initial manifold topology M and coordinate system that preserves semantic relationships from the original content.

If the initialization path involves direct instantiation rather than content ingestion, the method proceeds to step 535 where the system constructs a base manifold from templates or genre specifications. This construction may utilize predefined manifold topologies representing different cognitive domains, narrative genres, or interaction styles. The base manifold provides a scaffold that will be customized according to user specifications.

Step 545 generates the initial metric tensor $g_{ij}$ that defines distances and angles on the manifold. For ingested content, the metric derives from semantic similarities in the projection space, with $g_{ij}=\langle \nabla_i\Psi_c, \nabla_j\Psi_c\rangle$ where $\Psi_c$ are diffusion coordinates. For instantiated manifolds, the metric may begin as a standard metric (such as Euclidean or hyperbolic) subsequently modified by user constraints. The system ensures the metric tensor is positive definite and smooth across the manifold.

In step 550, the system initializes the curvature field R (x) that shapes the geometric structure of experience. For narrative content, curvature is computed from tension gradients using (in some embodiments) $R(x)=\beta_1\nabla^2\tau(x)+\beta_2\|\nabla\tau(x)\|^2$ where $\tau(x)$ represents narrative or thematic intensity. High curvature regions correspond to areas of semantic density, conflict, or significance. For instantiated manifolds, curvature patterns may follow genre templates or user-specified distributions.

Step 560 establishes the compression pressure field P(x,t) that will govern abstraction and memory consolidation. Initial pressure is set based on information density and redundancy patterns in the source content, with $P(x,0)=\kappa R(x,0)+\lambda \log \rho(x,0)$ where $\rho$ represents local content density. This pressure field creates gradients that will drive future curation and generalization processes during manifold evolution.

In step 570, the system creates the potential field $\Phi(x)$ encoding goals, attractors, and intentional structures. For ingested content, the potential derives from topic salience and emotional significance using $\Phi(x)=\gamma_1 H_t(x)+\gamma_2\sigma_t(x)$ where $H_t$ is topic entropy and $\sigma_t$ is emotional salience. User-specified goals modulate these potentials through additional terms. The potential field establishes the initial "motivational landscape" that will guide cognitive trajectories.

Step 580 performs multi-scale initialization across the manifold hierarchy $M_1$, $M_2$, and $M_3$. Fast manifold $M_1$ receives fine-grained perceptual or linguistic elements, mesoscale manifold $M_2$ captures thematic arcs and conceptual structures, and foundational manifold $M_3$ encodes style, identity, and persistent characteristics. The system ensures consistency across scales through compatible projections while allowing each level to capture appropriate temporal and semantic granularity.

In step 590, the system validates the geometric consistency of the initialized manifold. This validation checks that the metric tensor is positive definite everywhere, verifies that curvature values are finite and smooth, ensures the potential field has appropriate gradient structure, and confirms that compression pressure is non-negative. Any inconsistencies trigger local corrections or re-initialization of affected regions.

Step 595 configures the initial operational parameters for the experiential manifold. These parameters include pulse frequencies $\omega_f$, $\omega_m$, $\omega_s$ for different temporal scales, dream cycle scheduling and amplitude coefficients, federation permissions and consent boundaries, and persistence checkpointing intervals. The configuration ensures the manifold is ready for active use and autonomous evolution.

In step 596, the system establishes the persistence state for the newly created manifold. This may comprise serializing the initial geometric fields (g, R, P, $\Phi$), creating the first checkpoint in the persistence layer, initializing provenance logs for transparency tracking, and registering the manifold in the user's cognitive portfolio. The persistence state ensures the manifold will maintain continuity across system sessions.

Step 597 optionally performs an initial evolution cycle to settle the manifold into a stable configuration. This brief autonomous evolution allows geometric fields to reach local equilibrium through gradient flow, initial curvature diffusion to smooth sharp features, and potential field relaxation to establish natural basins. This settling process creates a more coherent starting state for user interaction.

The method concludes when the initialized experiential manifold is ready for user inhabitation. The system has transformed raw input or specifications into a complete geometric cognitive space with metric structure defining semantic relationships, curvature encoding meaning density, compression pressure enabling abstraction, potential fields guiding attention and goals, multi-scale organization supporting various cognitive timescales, and persistence mechanisms ensuring continuity. The manifold now exists as an autonomous cognitive entity capable of learning, dreaming, and evolving through interaction and time.

Throughout the initialization method 500, the system maintains mathematical rigor while creating experientially rich cognitive spaces. Whether beginning from existing content or user imagination, the method produces a geometrically consistent, semantically meaningful, and computationally tractable manifold that serves as the substrate for persistent experiential cognition. This initialization process establishes not just data structures but living cognitive geometries that will grow and transform through use.

Figure 6:
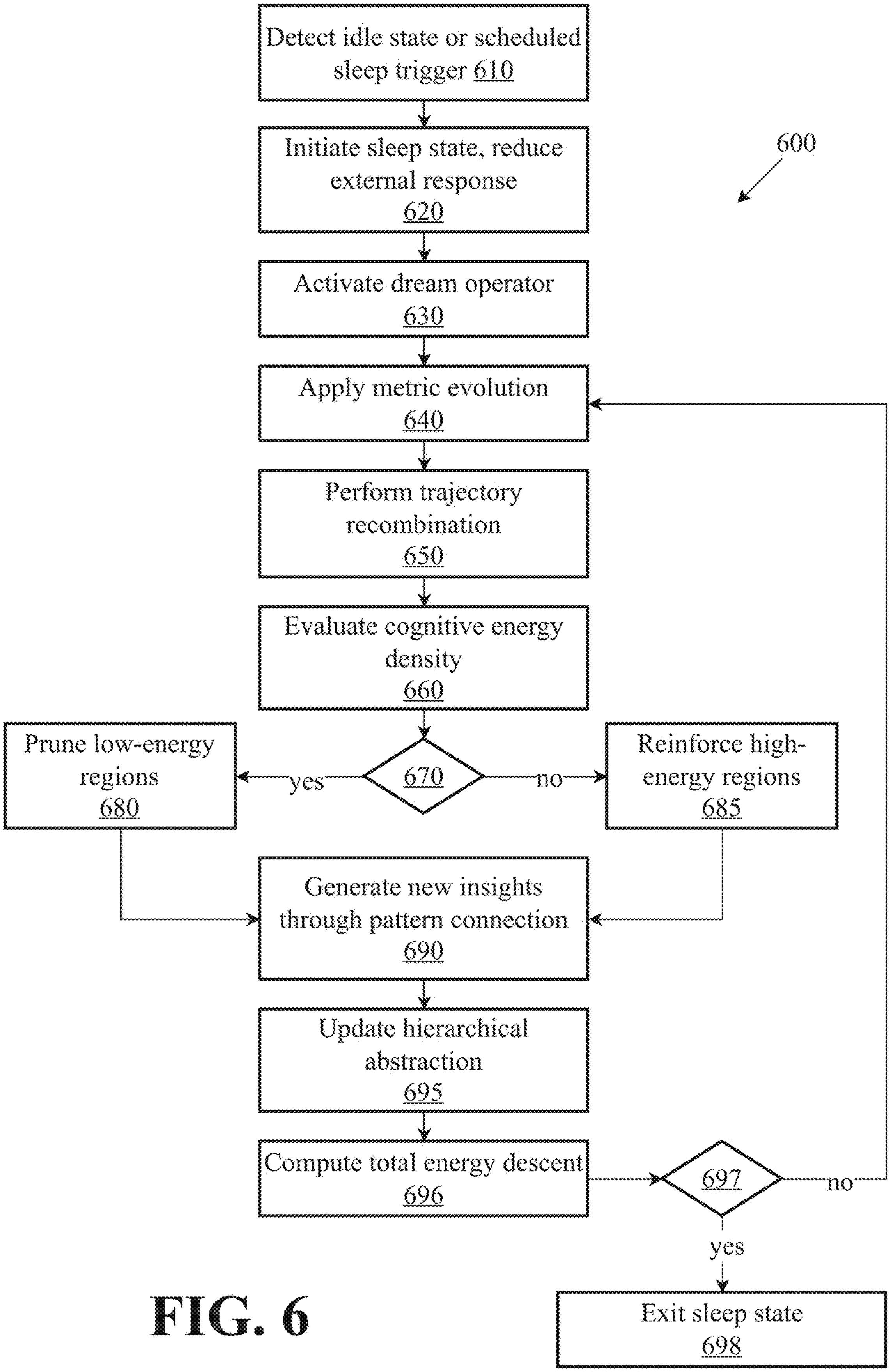
FIG. 6 is a flow diagram illustrating an exemplary method for autonomous dreaming and curation within the experiential manifold cognition system, according to an embodiment.

FIG. 6 is a flow diagram illustrating an exemplary method for autonomous dreaming and curation within the experiential manifold cognition system, according to an embodiment. The method 600 enables the persistent cognitive machine to perform autonomous geometric evolution during non-interactive periods, consolidating experiences, generating insights, and optimizing manifold structure without external input.

According to the embodiment, the process begins at step 610 where the system detects conditions appropriate for entering a sleep state. These conditions may include extended periods of user inactivity, scheduled sleep cycles based on temporal patterns, accumulated cognitive load requiring consolidation, or explicit sleep triggers from the sleep manager. The detection process monitors interaction frequency, manifold energy levels, and temporal schedules to determine optimal timing for autonomous processing.

In step 620, the system initiates the sleep state by reducing responsiveness to external stimuli. This transition may comprise increasing activation thresholds for external inputs, redirecting computational resources from interaction processing to internal geometric operations, and signaling to connected systems that the manifold is entering a maintenance phase. The system maintains minimal monitoring for high-priority wake triggers while focusing primarily on internal evolution.

Step 630 activates the dream operator that governs autonomous manifold transformation. The dream operator orchestrates multiple geometric processes including, but not limited to, curvature flow, trajectory synthesis, and structural optimization. Activation involves initializing dream parameters including amplitude coefficient $\sigma$, recombination rate, and energy thresholds that control the balance between exploration and stability during the dreaming process.

In step 640, the system applies the metric evolution equation $\partial g_{ij}/\partial t=-2Ric_{ij}+\Phi_{ij}+\sigma C_{ij}$ to update the manifold's geometric structure. Here $Ric_{ij}$ represents the Ricci curvature tensor driving geometric flow toward uniformity, $\Phi_{ij}=\nabla_i\nabla_j\Phi$ represents the Hessian of the potential field encoding latent goals, and $C_{ij}$ represents correlation tensors derived from recent cognitive trajectories. This evolution smooths redundant structure while reinforcing meaningful patterns, allowing the manifold to self-organize based on accumulated experience.

Step 650 performs trajectory recombination to generate novel experiential pathways. The system applies the recombination operator $R(\gamma a, \gamma b)=\exp \gamma a(0)[\alpha \log \gamma a(0)\ \gamma b(0)]+\varepsilon$ to blend previously independent trajectories, where a controls interpolation strength and $\varepsilon$ introduces controlled stochastic variation. Recombined trajectories are evaluated for coherence using the functional $F[\gamma]=\int[0,T](\|\dot{\gamma}(t)\|^2+P(\gamma(t))-\Phi(\gamma(t)))dt$, with only semantically consistent paths retained for integration into the manifold structure.

In step 660, the system evaluates cognitive energy density $Ep=\|A(p)\|^2+P(p)-\Phi(p)$ across the manifold, where $A(p)$ represents local attention velocity, $P(p)$ compression pressure, and $\Phi(p)$ goal potential. This evaluation identifies regions of high and low cognitive significance, guiding subsequent pruning and reinforcement decisions. Energy density serves as a measure of semantic importance and computational efficiency.

Step 670 branches based on energy density evaluation. For regions where $Ep<\theta c$ (below the curation threshold), the method proceeds to step 680 where low-energy regions are pruned according to $\partial\rho(p)/\partial t=-\lambda(1-H(Ep-\theta c))\rho(p)$, gradually reducing the density of semantically insignificant areas. For regions where $Ep\geq\theta c$, step 685 reinforces high-energy structures by strengthening metric components and deepening potential wells, ensuring that important cognitive patterns persist and become more accessible.

Following pruning or reinforcement, step 690 generates new insights by identifying and connecting previously unrelated patterns across the manifold. The system searches for indirect paths between semantically distant regions, identifies analogical relationships through spectral analysis, and synthesizes novel connections that emerge from the recombined geometric structure. These insights are themselves encoded as new thoughts within the manifold, enriching the cognitive space with emergent understanding.

Step 695 updates hierarchical abstractions across the manifold scales M1, M2, and M3. Experience accumulated on the fast manifold M1 is abstracted through submersion $\phi 12{:}M1\rightarrow M2$, while foundational constraints from M3 are injected into M2 via immersion $\psi 32{:}M3\rightarrow M2$. This cross-scale integration ensures that local experiences inform global understanding while maintaining coherence with enduring cognitive identity.

In step 696, the system computes the total energy descent to verify that the dreaming process is reducing cognitive entropy. The condition $dE_{tot}/dt=-\int_M\|\nabla(P-\Phi)\|^2\ d\mu(x)\leq 0$ ensures that each dream cycle produces a more organized and efficient manifold structure. This energy minimization drives the system toward stable configurations while maintaining sufficient complexity for rich cognitive function.

Step 697 checks for wake triggers that would necessitate exiting the sleep state. Wake triggers may include high-priority external inputs, scheduled wake times, completion of dream objectives, or detection of urgent conditions requiring immediate response. If no wake trigger is detected, the method returns to step 640 to continue the dreaming cycle. If a wake trigger is detected, the method proceeds to step 698.

In step 698, the system exits the sleep state through a controlled transition. This may comprise gradually reducing dream operator amplitude, restoring normal responsiveness to external stimuli, finalizing any in-progress geometric transformations, and updating persistence state with the evolved manifold structure. The transition ensures smooth continuity between the dreaming and active states, preserving all geometric improvements while resuming interactive capability.

Throughout method 600, the system maintains careful balance between exploration and stability, allowing the manifold to evolve creatively while preserving essential structure. The dreaming process enables continuous learning and optimization even in the absence of user interaction, ensuring that each experiential manifold becomes more coherent, efficient, and insightful over time.

Figure 7:
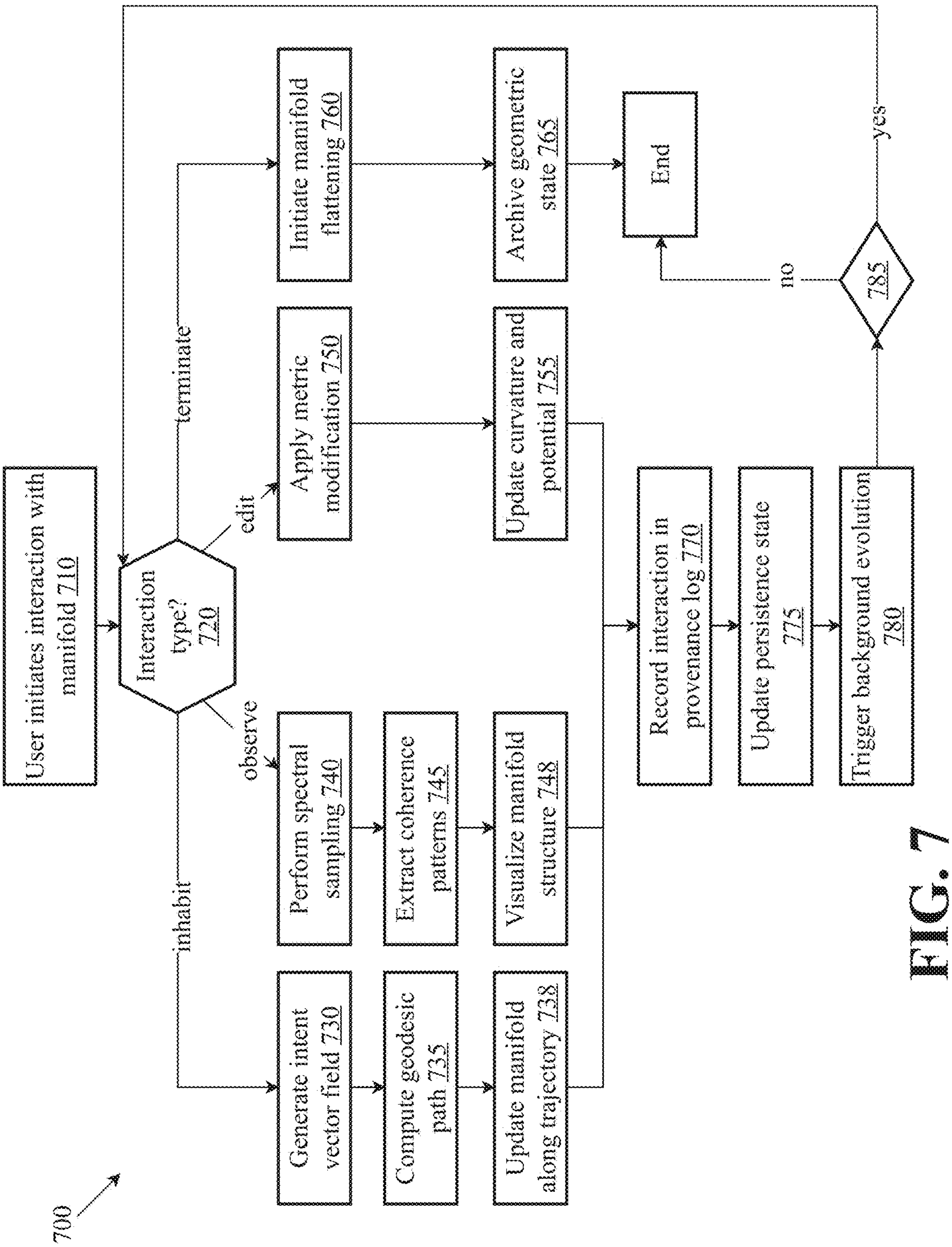
FIG. 7 is a flow diagram illustrating an exemplary method for user interaction with an experiential manifold within the persistent cognitive machine, according to an embodiment.

FIG. 7 is a flow diagram illustrating an exemplary method for user interaction with an experiential manifold within the persistent cognitive machine, according to an embodiment. The method 700 enables users to engage with their cognitive spaces through multiple modalities including inhabitation, observation, editing, and termination, with each interaction type producing specific geometric transformations on the manifold structure.

According to the embodiment, the process begins at step 710 where the user initiates interaction with their experiential manifold. This initiation may occur through various interfaces including, but not limited to, immersive visualization environments (e.g., virtual and/or augmented reality systems), command-based systems, or gestural controls. The system authenticates the user, loads their manifold from persistent storage if not already active, and prepares the geometric structures for interaction. The manifold state at interaction start represents the cumulative result of all previous interactions and autonomous evolution.

In step 720, the system determines the type of interaction requested by the user. The method branches into four primary interaction modes: inhabitation for experiential traversal, observation for analytical viewing, editing for direct geometric modification, and termination for archival or deletion. Each branch implements specialized geometric operations appropriate to the interaction intent while maintaining manifold consistency and recording all transformations for transparency.

For inhabitation interactions, the method proceeds to step 730 where the system generates an intent vector field $I(x)=\nabla U(x)$ based on user goals, curiosity, or directional input. The intent field creates gradients in the experiential space that guide subsequent navigation, with stronger gradients corresponding to more focused intent. User-specified goals, keywords, or emotional states modulate the scalar function $U(x)$ to produce appropriate directional bias in the vector field.

Step 735 computes the optimal geodesic path $\gamma(t)$ through the manifold that minimizes the action functional $S[\gamma]=\int[0, T](\|\dot{\gamma}(t)\|^2g+P-\Phi)dt$. This path represents the trajectory of least cognitive resistance modified by compression pressure P and goal potential $\Phi$, ensuring that navigation follows semantically meaningful routes rather than arbitrary traversals. The geodesic computation uses the current metric tensor g and incorporates the intent field to bias path selection toward user objectives.

In step 738, the system updates the manifold structure along the traversed trajectory. This update may comprise strengthening metric components along frequently traveled paths, modifying local curvature based on attention density, adjusting compression pressure to reflect accessed information, and creating new connections between visited regions. These modifications ensure that the manifold learns from interaction patterns, making future traversals more efficient and semantically aligned.

For observation interactions, step 740 performs spectral sampling of the Laplace-Beltrami operator to extract global manifold properties. The system computes eigenvalues $\lambda k$ and eigenfunctions $\psi k$ that characterize the manifold's fundamental modes, revealing coherence patterns, dimensional structure, and semantic clusters. This spectral decomposition provides a frequency-domain view of the cognitive space complementary to the spatial representation.

Step 745 extracts coherence patterns from the spectral analysis, identifying thematic clusters through eigenvector clustering, detecting semantic bridges between disparate concepts, measuring global connectivity and fragmentation, and locating regions of high curvature concentration. These patterns provide insight into the manifold's organizational structure and guide subsequent navigation or editing decisions.

In step 748, the system generates visualizations of the manifold structure appropriate to the observation goals. Visualizations may include three-dimensional renderings of local neighborhoods with curvature-based coloring, network diagrams showing concept relationships and geodesic distances, heat maps of compression pressure and potential fields, and temporal animations showing manifold evolution history. These visual representations translate abstract geometric properties into human-interpretable formats.

For editing interactions, step 750 applies direct metric modifications $\delta g_{ij}$ to reshape the manifold geometry according to user specifications. These modifications may strengthen or weaken connections between concepts, create new pathways by reducing geodesic distances, introduce barriers by increasing local distances, or reshape entire regions through coordinated metric updates. The system ensures that modifications preserve positive definiteness and smoothness of the metric tensor.

Step 755 updates dependent fields including curvature R and potential $\Phi$ to maintain consistency with the modified metric. Curvature updates follow from the metric changes through the Riemann curvature tensor computation, while potential field modifications reflect new goal structures or attentional patterns introduced by the edit. The system may also adjust compression pressure P in edited regions to encourage or discourage future evolution in those areas.

For termination interactions, step 760 initiates controlled manifold flattening through the transformation $g_{ij}\rightarrow\delta_{ij}$, $P\rightarrow 0$, $\Phi\rightarrow 0$. This process gradually reduces all geometric structure to a trivial flat state while preserving the informational content in an archival format. The flattening proceeds through stages to ensure data integrity and provide opportunities for cancellation if initiated accidentally.

Step 765 archives the final geometric state before complete flattening, creating a static record that includes the final metric tensor configuration, curvature distribution at termination, complete interaction history and provenance, and manifold topology and connectivity data. This archive enables future analysis or potential restoration while freeing active computational resources.

Following any interaction branch, step 770 records the complete interaction details in an immutable provenance log. This recording may comprise timestamp and duration information, specific geometric transformations applied, regions of the manifold affected, and any user annotations or metadata. The provenance system supports the transparency invariant by providing a complete audit trail of all manifold modifications.

Step 775 updates the persistence layer with the current manifold state, ensuring continuity across sessions. This update may serialize modified geometric fields, creates incremental checkpoints for efficient storage, updates indices and acceleration structures, and synchronizes any federated connections. The persistence update occurs asynchronously to avoid interrupting user interaction flow.

In step 780, the system triggers background evolution processes that will continue after active interaction ceases. These processes may comprise gentle curvature flow to smooth abrupt modifications, trajectory recombination based on new connections, compression pressure equilibration across the manifold, and potential field diffusion from edited regions. This triggering ensures that user modifications integrate smoothly with the manifold's autonomous evolution.

Step 785 determines whether the user wishes to continue interacting with the manifold. If continued interaction is desired, the method returns to step 720 for the next interaction cycle. If the user chooses to exit, the method proceeds to the end state, leaving the manifold in a coherent configuration ready for autonomous evolution or future interaction sessions.

Throughout method 700, the system maintains responsiveness while ensuring geometric consistency, creating a fluid interaction experience where user intent translates directly into manifold transformation. Each interaction type leverages the mathematical structure of the experiential manifold to provide intuitive yet powerful cognitive operations, enabling users to navigate, analyze, reshape, and manage their persistent cognitive spaces through natural geometric metaphors.

Figure 8:
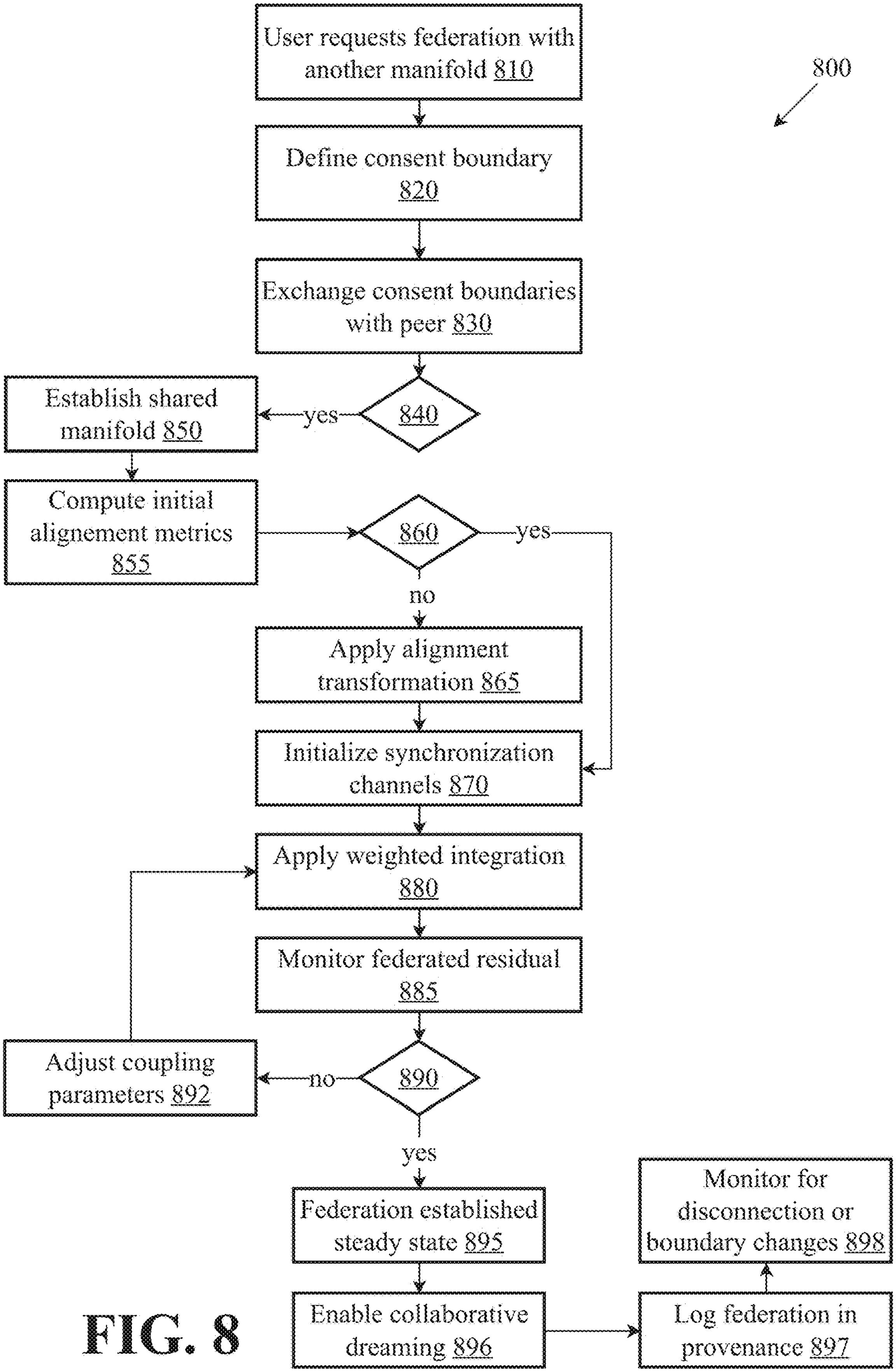
FIG. 8 is a flow diagram illustrating an exemplary method for establishing and maintaining federation between experiential manifolds within the persistent cognitive machine, according to an embodiment.

FIG. 8 is a flow diagram illustrating an exemplary method for establishing and maintaining federation between experiential manifolds within the persistent cognitive machine, according to an embodiment. The method 800 enables multiple users to create shared cognitive spaces while preserving individual autonomy through controlled geometric synchronization and consent-based boundaries.

According to the embodiment, the process begins at step 810 where a user initiates a federation request with another experiential manifold. This request may originate from explicit user action, automatic discovery of compatible manifolds, or invitation from another user. The system identifies the target manifold, establishes communication channels, and verifies that both systems support compatible federation protocols. Initial handshaking confirms protocol versions, encryption capabilities, and basic manifold characteristics.

In step 820, the user defines their consent boundary which delineates regions of their manifold eligible for federation. The consent boundary is determined by comparing the local potential field $\Phi_u(x)$ against a sharing threshold $\Phi_{share}$, where lower potential values indicate regions the user is comfortable sharing. Users may adjust $\Phi_{share}$ to expand or contract their consent boundary based on trust levels, collaboration goals, or privacy preferences. The system provides tools to visualize and modify consent boundaries before federation proceeds.

Step 830 exchanges consent boundary specifications between the participating systems. This exchange may comprise compressed representations of boundary regions, topological characteristics of shareable areas, semantic summaries of content within boundaries, and metadata about federation preferences. The exchange protocol ensures that boundary information is transmitted securely and cannot be intercepted or modified by unauthorized parties.

In step 840, the system evaluates whether the intersection of consent boundaries is non-empty. This geometric test determines if there are any regions where both users have consented to sharing, which is a necessary condition for federation. If the intersection is empty, the method proceeds to step 845 where federation is rejected with appropriate user notification explaining that no overlapping consent regions exist. If overlap exists, the method continues to step 850.

Step 850 establishes the shared submanifold at the intersection of consenting regions. This shared space inherits geometric properties from both parent manifolds through averaged metrics and potentials. The system creates bidirectional mappings $F_{uv}:M_u \rightarrow M_v$ and $F_{vu}:M_v \rightarrow M_u$ restricted to the shared region, enabling geometric transformations between the manifold representations.

In step 855, the system computes initial alignment metrics to quantify geometric compatibility between the manifolds. The metric divergence $D_{metric}(M_u, M_v)$ measures differences in distance structures, while spectral divergence $D_{spectral}$ (Mu, Mv) compares eigenvalue spectra of the Laplace-Beltrami operators. These metrics provide quantitative measures of how well the manifolds align before synchronization begins.

Step 860 determines whether the alignment metrics fall within acceptable tolerance $\varepsilon^2$. If manifolds are already well-aligned ($D_{metric}<\varepsilon^2$ and $D_{spectral}<\varepsilon^2$), the method proceeds directly to synchronization. If alignment exceeds tolerance, step 865 applies transformation operators to improve geometric compatibility. These transformations may include isometric adjustments that preserve local structure while improving global alignment, spectral filtering to match frequency characteristics, or potential field harmonization to align goal structures.

In step 870, the system initializes secure synchronization channels for ongoing geometric updates. Channel initialization includes establishing encrypted communication protocols, configuring update frequencies based on available bandwidth, setting up differential encoding for efficient transmission, and creating buffers for asynchronous update handling. The channels support bidirectional flow of geometric information while maintaining privacy for non-shared regions.

Step 875 begins the exchange of geometric updates represented as differentials ($\Delta g$, $\Delta R$, $\Delta\Phi$). Rather than transmitting complete manifold representations, the system sends compressed updates including metric tensor changes $\Delta g_{ij}$, curvature modifications $\Delta R$, and potential field adjustments $\Delta\Phi$. These differentials capture how each manifold evolves during use, enabling synchronized evolution of shared regions while minimizing bandwidth requirements.

In step 880, the system applies weighted integration of received updates using the formula $g_i \leftarrow (1-\kappa_{ij})g_i+\kappa_{ij}F^*_{ij}g_j$, where $\kappa_{ij}\in[0,1]$ represents the coupling strength between manifolds. The coupling coefficient $\kappa_{ij}$ can be determined by trust levels, desired synchronization tightness, and stability requirements. This weighted averaging allows each manifold to incorporate influences from federated partners while maintaining individual characteristics in non-shared regions.

Step 885 monitors the federated residual functional $C_{fed}$ which quantifies the overall tension in the federated system. Here $C_i(p)$ represents internal cognitive tension within each manifold, while the divergence terms measure misalignment between federated partners. Minimizing $C_{fed}$ drives the system toward collective coherence.

In step 890, the system evaluates whether the federated residual has reached a stable value, indicating convergence of the synchronization process. If $C_{fed}$ continues to decrease significantly or oscillate, step 892 adjusts coupling parameters $\kappa_{ij}$ using gradient descent $\kappa_{ij}(t+1)=\kappa_{ij}(t)-\beta\nabla\kappa_{ij}C_{fed}$ to improve convergence. The method then returns to step 880 for continued synchronization with updated parameters.

Once convergence is achieved, step 895 confirms that federation has reached steady state. The shared submanifold now maintains coherent geometry across both parent manifolds, with ongoing synchronization preserving alignment during continued use. Users can interact with shared regions from their individual perspectives while experiencing consistent semantic structure.

Step 896 enables collaborative dreaming capabilities for the federated manifolds. During sleep states, dream-induced modifications in one manifold propagate to federated partners according to $\delta g_j=\kappa_{ij} F_{ij}^*(\delta g_i)$, allowing shared evolution even during non-interactive periods. This collaborative dreaming deepens the connection between federated manifolds over time, creating genuinely shared cognitive spaces that evolve through collective unconscious processes.

In step 897, the system logs complete federation details in immutable provenance records. These logs include participating manifold identities, consent boundary configurations, initial and current alignment metrics, synchronization history and update patterns, and any manual interventions or parameter adjustments. This comprehensive logging supports both transparency requirements and debugging of federation issues.

Step 898 establishes ongoing monitoring for federation health, watching for disconnection events due to network failures, changes in consent boundaries that eliminate overlap, divergence of alignment metrics beyond acceptable thresholds, or explicit termination requests from users. The monitoring system can trigger re-alignment procedures, adjust coupling parameters, or gracefully terminate federation while preserving individual manifold integrity.

Throughout method 800, the system balances collaborative benefits with individual autonomy, ensuring that federation enhances rather than compromises each user's cognitive sovereignty. The geometric approach to synchronization preserves semantic meaning while allowing flexible coupling strengths, creating a mathematical foundation for genuine cognitive collaboration. This federation capability transforms isolated experiential manifolds into a connected cognitive ecosystem where knowledge and understanding can flow freely within consent boundaries.

Exemplary Computing Environment

Figure 9:
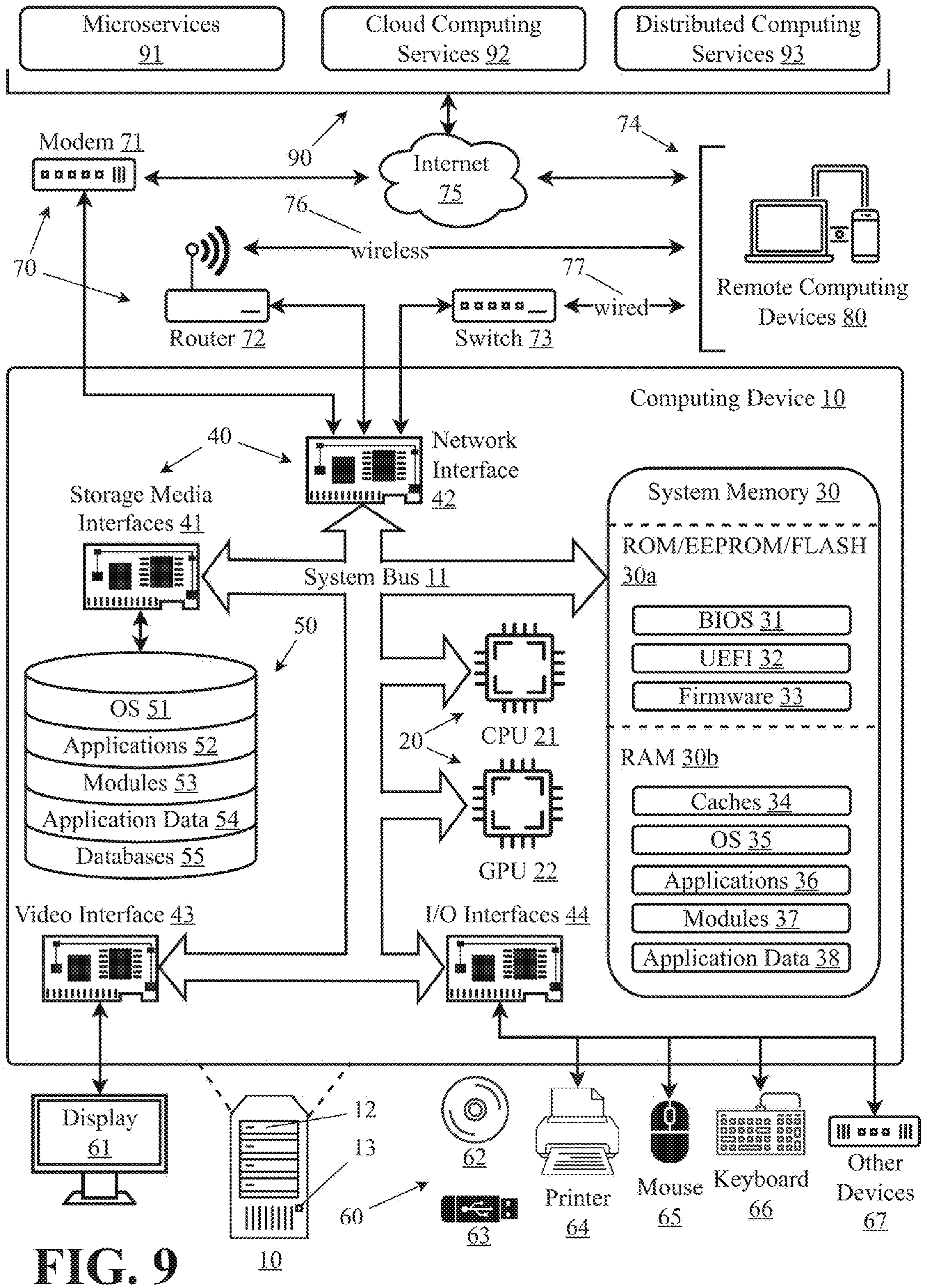
FIG. 9 illustrates an exemplary computing environment on which an embodiment described herein may be implemented.

FIG. 9 illustrates an exemplary computing environment (also referred to herein as a computing system) on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5 D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system for implementing experiential manifold cognition comprising:

a memory storing processor-executable instructions;

one or more processors configured to execute the instructions to:

maintain an experiential manifold data structure comprising a differentiable manifold, a Riemannian metric tensor encoding semantic relationships between cognitive elements, a compression pressure field governing memory consolidation and abstraction, and a potential field encoding goals and attentional focus;

receive input data at a streaming data handler that:

monitors for incoming data;

applies incremental updates to diffusion coordinates and manifold topology without global recomputation; and manages data buffers with temporal windowing to maintain geometric consistency during real-time data ingestion;

transform the input data into geometric representations on the experiential manifold using adaptive geometric diffusion based on semantic similarity relationships;

execute geometric transformations on the experiential manifold using a Graphics Processing Unit (GPU)-accelerated processing architecture implementing a multi-queue operator scheduler that coordinates parallel execution of geometric operator kernels, wherein the geometric transformations comprise one or more of:

metric evolution based on curvature and field gradients;

geodesic computation for determining optimal paths through the differentiable manifold; and curvature estimation for guiding manifold evolution;

perform autonomous manifold evolution during non-interactive periods through trajectory recombination and selective pruning based on cognitive energy density;

provide a user interface enabling visualization of manifold structure, interactive navigation through the cognitive space, and direct manipulation of geometric properties;

translate user actions into geometric operations wherein user navigation corresponds to geodesic traversal and user edits correspond to metric modifications;

maintain continuity of the experiential manifold across system sessions by preserving geometric field data including the metric tensor, curvature values, compression pressure, and potential fields; and enable controlled synchronization between multiple experiential manifolds through shared submanifolds at an intersection of user-defined consent boundaries and weighted integration of geometric updates; and wherein the computer system maintains persistent cognitive capabilities through continuous geometric evolution of the experiential manifold both during user interaction and autonomous operation.

2. The computer system of claim 1, wherein the adaptive geometric diffusion constructs a landmark graph from representative semantic elements and computes diffusion maps to establish manifold topology that preserves semantic relationships from input content.

3. The computer system of claim 1, wherein the autonomous manifold evolution implements a dream operator that applies metric flow equations to smooth redundant structure while reinforcing meaningful patterns through curvature concentration.

4. The computer system of claim 1, wherein the computer system maintains a hierarchical manifold structure comprising a fast manifold for immediate perceptual events, a mesoscale manifold for thematic structures, and a foundational manifold for persistent identity and style.

5. The computer system of claim 4, wherein the hierarchical manifold structure implements cross-scale integration through upward abstraction from fast to slow manifolds and downward constraint injection from slow to fast manifolds.

6. The computer system of claim 1, wherein the user interface generates three-dimensional renderings of manifold neighborhoods with curvature-based visualization and provides real-time navigation feedback as users traverse geodesic paths.

7. The computer system of claim 1, wherein enabling the synchronization between multiple experiential manifolds maintains privacy through consent boundaries that restrict which manifold regions participate in geometric update exchanges.

8. The computer system of claim 1, wherein the computer system implements temporal pulse regulation that dynamically adjusts processing frequencies based on cognitive load and manifold complexity.

9. The computer system of claim 1, wherein the compression pressure field implements selective memory consolidation by identifying regions of high semantic density for preservation while allowing low-importance regions to fade through geometric diffusion.

10. The computer system of claim 1, wherein the computer system maintains an immutable provenance log recording all geometric transformations applied to the differentiable manifold, supporting transparency and reversibility of operations.

11. A computer-implemented method for experiential manifold cognition comprising the steps of:

maintaining, by one or more processors, an experiential manifold data structure comprising a differentiable manifold, a Riemannian metric tensor encoding semantic relationships between cognitive elements, a compression pressure field governing memory consolidation and abstraction, and a potential field encoding goals and attentional focus;

receiving input data at a streaming data handler that:

monitors for incoming data;

applies incremental updates to diffusion coordinates and manifold topology without global recomputation; and manages data buffers with temporal windowing to maintain geometric consistency during real-time data ingestion;

transforming the input data into geometric representations on the experiential manifold using adaptive geometric diffusion based on semantic similarity relationships;

executing geometric transformations on the experiential manifold including using a Graphics Processing Unit (GPU)-accelerated processing architecture implementing a multi-queue operator scheduler that coordinates parallel execution of geometric operator kernels, wherein the geometric transformations comprise one or more of:

metric evolution based on curvature and field gradients;

geodesic computation for determining optimal paths through the differentiable manifold; and curvature estimation for guiding manifold evolution;

performing autonomous manifold evolution during non-interactive periods through trajectory recombination and selective pruning based on cognitive energy density;

providing a user interface enabling visualization of manifold structure, interactive navigation through the cognitive space, and direct manipulation of geometric properties;

translating user actions into geometric operations wherein user navigation corresponds to geodesic traversal and user edits correspond to metric modifications;

maintaining continuity of the experiential manifold across system sessions by preserving geometric field data including the metric tensor, curvature values, compression pressure, and potential fields; and enabling controlled synchronization between multiple experiential manifolds through shared submanifolds at an intersection of user-defined consent boundaries and weighted integration of geometric updates;

wherein persistent cognitive capabilities are maintained through continuous geometric evolution of the experiential manifold both during user interaction and autonomous operation.

12. The method of claim 11, wherein the adaptive geometric diffusion comprises constructing a landmark graph from representative semantic elements and computing diffusion maps to establish manifold topology that preserves semantic relationships from input content.

13. The method of claim 11, wherein the autonomous manifold evolution comprises implementing a dream operator that applies metric flow equations to smooth redundant structure while reinforcing meaningful patterns through curvature concentration.

14. The method of claim 11, further comprising maintaining a hierarchical manifold structure comprising a fast manifold for immediate perceptual events, a mesoscale manifold for thematic structures, and a foundational manifold for persistent identity and style.

15. The method of claim 14, wherein maintaining the hierarchical manifold structure comprises implementing cross-scale integration through upward abstraction from fast to slow manifolds and downward constraint injection from slow to fast manifolds.

16. The method of claim 11, wherein providing the user interface comprises generating three-dimensional renderings of manifold neighborhoods with curvature-based visualization and providing real-time navigation feedback as users traverse geodesic paths.

17. The method of claim 11, wherein enabling synchronization between multiple experiential manifolds comprises maintaining privacy through consent boundaries that restrict which manifold regions participate in geometric update exchanges.

18. The method of claim 11, further comprising implementing temporal pulse regulation that dynamically adjusts processing frequencies based on cognitive load and manifold complexity.

19. The method of claim 11, wherein the compression pressure field implements selective memory consolidation by identifying regions of high semantic density for preservation while allowing low-importance regions to fade through geometric diffusion.

20. The method of claim 11, further comprising maintaining an immutable provenance log recording all geometric transformations applied to the differentiable manifold, supporting transparency and reversibility of operations.

* * * * *